US008715058B2

(12) United States Patent
Pennington et al.

(10) Patent No.: US 8,715,058 B2
(45) Date of Patent: May 6, 2014

(54) REEL AND VIDEO COMBINATION MACHINE

(75) Inventors: Richard M. Pennington, Reno, NV (US); Chauncey W. Griswold, Reno, NV (US); William R. Wells, Reno, NV (US); Harold E. Mattice, Gardnerville, NV (US); Richard L. Wilder, Sparks, NV (US)

(73) Assignee: IGT, Las Vegas, NV (US)

( * ) Notice: Subject to any disclaimer, the term of this patent is extended or adjusted under 35 U.S.C. 154(b) by 1358 days.

(21) Appl. No.: 12/245,490

(22) Filed: Oct. 3, 2008

(65) Prior Publication Data

US 2009/0036208 A1 Feb. 5, 2009

Related U.S. Application Data

(63) Continuation-in-part of application No. 11/514,808, filed on Sep. 1, 2006, which is a continuation-in-part of application No. 10/213,626, filed on Aug. 6, 2002, now Pat. No. 7,841,944, and a continuation-in-part of application No. 10/755,598, filed on Jan. 12, 2004.

(51) Int. Cl.

| | |
|---|---|
| ***A63F 5/04*** | (2006.01) |
| ***A63F 9/24*** | (2006.01) |
| *A63F 13/00* | (2006.01) |
| *A63B 71/04* | (2006.01) |

(52) U.S. Cl.

USPC .................. 463/20; 463/31; 463/32; 463/33; 273/143 R

(58) Field of Classification Search

USPC ....................... 463/32, 31, 20, 33; 273/143 R

See application file for complete search history.

(56) References Cited

U.S. PATENT DOCUMENTS

| | | | |
|---|---|---|---|
| 3,708,219 | A | 1/1973 | Forlini et al. |
| 4,333,715 | A | 6/1982 | Brooks |
| 4,517,558 | A | 5/1985 | Davids |
| 4,574,391 | A | 3/1986 | Morishima |
| 4,607,844 | A | 8/1986 | Fullerton |
| 4,621,814 | A | 11/1986 | Stephen et al. |
| 4,659,182 | A | 4/1987 | Aizawa |
| 4,718,672 | A | 1/1988 | Okada |

(Continued)

FOREIGN PATENT DOCUMENTS

| | | |
|---|---|---|
| AU | 721968 | 7/2000 |
| AU | 2000 PQ9586 | 8/2000 |

(Continued)

OTHER PUBLICATIONS

US Office Action dated Mar. 30, 2010 issued in U.S. Appl. No. 11/938,086.

(Continued)

*Primary Examiner* — Masud Ahmed
*Assistant Examiner* — Frank M Leiva
(74) *Attorney, Agent, or Firm* — Foley & Lardner LLP

(57) ABSTRACT

Methods, systems, and apparatus are provided for displaying game related information on gaming machines. The gaming machines include two or more game presentation devices such as rotating reels, video display screens, touch screens, etc. One or more of these game presentation devices can be moved into and out of position with respect to other game presentation devices. This may allow, among other things, flexibility in presenting different types of games or different game features within a single game.

63 Claims, 14 Drawing Sheets

(56) References Cited

U.S. PATENT DOCUMENTS 4,911,449 A 3/1990 Dickinson et al.
4,912,548 A 3/1990 Shanker et al.
5,086,354 A 2/1992 Bass et al.
5,113,272 A 5/1992 Reamey
5,132,839 A 7/1992 Travis
5,152,529 A 10/1992 Okada
5,319,491 A 6/1994 Selbrede
5,342,047 A 8/1994 Heidel et al.
5,364,100 A 11/1994 Ludlow et al.
5,375,830 A 12/1994 Takemoto et al.
5,376,587 A 12/1994 Buchmann et al.
5,393,057 A 2/1995 Marnell
5,393,061 A 2/1995 Manship et al.
5,395,111 A 3/1995 Inoue
5,467,893 A 11/1995 Landis, II et al.
5,539,547 A 7/1996 Ishii et al.
5,580,055 A 12/1996 Hagiwara
5,585,821 A 12/1996 Ishikura et al.
5,589,980 A 12/1996 Bass et al.
5,647,798 A 7/1997 Faiciglia
5,725,428 A 3/1998 Achmueller
5,745,197 A 4/1998 Leung et al.
5,752,881 A 5/1998 Inoue
5,762,552 A 6/1998 Vuong et al.
5,764,317 A 6/1998 Sadovnik et al.
5,785,315 A 7/1998 Eiteneer et al.
5,788,573 A 8/1998 Baerlocher et al.
5,833,537 A 11/1998 Barrie
5,851,148 A 12/1998 Brune et al.
5,910,046 A 6/1999 Wada et al.
5,923,307 A 7/1999 Hogle, IV
5,951,397 A 9/1999 Dickinson
5,956,180 A 9/1999 Bass et al.
5,967,893 A 10/1999 Lawrence et al.
5,988,638 A 11/1999 Rodesch et al.
5,993,027 A 11/1999 Yamamoto et al.
6,001,016 A 12/1999 Walker et al.
6,015,346 A 1/2000 Bennett
6,027,115 A 2/2000 Griswold et al.
6,050,895 A 4/2000 Luciano et al.
6,054,969 A 4/2000 Haisma
6,057,814 A 5/2000 Kalt
6,059,289 A 5/2000 Vancura
6,059,658 A 5/2000 Mangano et al.
6,068,552 A 5/2000 Walker
6,086,066 A * 7/2000 Takeuchi et al. .......... 273/143 R
6,093,102 A 7/2000 Bennett
6,135,884 A 10/2000 Hedrick et al.
6,159,095 A 12/2000 Frohm et al.
6,159,098 A 12/2000 Slomiany et al.
6,168,520 B1 1/2001 Baerlocher et al.
6,190,255 B1 2/2001 Thomas et al.
6,213,875 B1 4/2001 Suzuki
6,227,971 B1 5/2001 Weiss
6,234,897 B1 5/2001 Frohm et al.
6,244,596 B1 6/2001 Kondratjuk
6,251,013 B1 6/2001 Bennett
6,251,014 B1 6/2001 Stockdale et al.
6,252,707 B1 6/2001 Kleinberger et al.
6,254,481 B1 7/2001 Jaffe
6,261,178 B1 7/2001 Bennett
6,270,411 B1 8/2001 Gura et al.
6,297,785 B1 10/2001 Sommer et al.
6,315,666 B1 11/2001 Mastera et al.
6,322,445 B1 11/2001 Miller
6,337,513 B1 1/2002 Clevenger et al.
6,347,996 B1 2/2002 Gilmore et al.
6,368,216 B1 4/2002 Hedrick et al.
6,379,244 B1 4/2002 Sagawa et al.
6,398,220 B1 6/2002 Inoue
6,398,644 B1 6/2002 Perrie et al.
6,404,436 B1 6/2002 Goden
6,416,827 B1 7/2002 Chakrapani et al.
6,444,496 B1 9/2002 Edwards et al.
6,445,185 B1 9/2002 Damadian et al.
6,491,583 B1 12/2002 Gauselmann
6,503,147 B1 1/2003 Stockdale et al.
6,511,375 B1 1/2003 Kaminkow
6,512,559 B1 1/2003 Hashimoto et al.
6,514,141 B1 2/2003 Kaminkow et al.
6,517,433 B2 2/2003 Loose et al.
6,517,437 B1 2/2003 Wells et al.
6,520,856 B1 2/2003 Walker et al.
6,532,146 B1 3/2003 Duquette
6,547,664 B2 4/2003 Saunders
6,575,541 B1 6/2003 Hedrick et al.
6,585,591 B1 7/2003 Baerlocher et al.
6,612,927 B1 9/2003 Slomiany
D480,961 S 10/2003 Deadman
6,643,124 B1 11/2003 Wilk
6,644,664 B2 11/2003 Muir et al.
6,646,695 B1 11/2003 Gauselmann
6,652,378 B2 11/2003 Cannon et al.
6,659,864 B2 12/2003 McGahn et al.
6,661,425 B1 12/2003 Hiroaki
6,695,696 B1 2/2004 Kaminkow
6,695,703 B1 2/2004 McGahn
6,702,675 B2 3/2004 Poole et al.
6,712,694 B1 3/2004 Nordman
6,715,756 B2 4/2004 Inoue
6,717,728 B2 4/2004 Putilin
6,722,979 B2 4/2004 Gilmore et al.
6,802,777 B2 10/2004 Seelig et al.
6,817,945 B2 11/2004 Seelig et al.
6,817,946 B2 11/2004 Motegi et al.
6,859,219 B1 2/2005 Sall
6,887,157 B2 5/2005 LeMay et al.
6,890,259 B2 5/2005 Breckner et al.
6,906,762 B1 6/2005 Witehira et al.
6,908,381 B2 6/2005 Ellis
6,923,441 B2 8/2005 Inoue
6,937,298 B2 8/2005 Okada
6,981,635 B1 1/2006 Hughs-Baird et al.
7,040,987 B2 5/2006 Walker et al.
7,056,215 B1 6/2006 Olive
7,095,180 B2 8/2006 Emslie et al.
7,095,450 B1 8/2006 Holmes et al.
7,097,560 B2 8/2006 Okada
7,108,603 B2 9/2006 Olive
7,115,033 B1 10/2006 Timperley
7,128,647 B2 10/2006 Muir
7,159,865 B2 1/2007 Okada
7,160,187 B2 1/2007 Loose et al.
7,166,029 B2 1/2007 Enzminger
7,204,753 B2 4/2007 Ozaki et al.
7,207,883 B2 4/2007 Nozaki et al.
7,220,181 B2 5/2007 Okada
7,227,510 B2 6/2007 Mayer, III et al.
7,237,202 B2 6/2007 Gage
7,252,288 B2 8/2007 Seelig et al.
7,252,591 B2 8/2007 Van Asdale
7,255,643 B2 8/2007 Ozaki et al.
7,274,413 B1 9/2007 Sullivan et al.
7,285,049 B1 * 10/2007 Luciano et al. ................. 463/42
7,309,284 B2 12/2007 Griswold et al.
7,322,884 B2 1/2008 Emori et al.
7,324,094 B2 1/2008 Moilanen et al.
7,329,181 B2 2/2008 Hoshino et al.
7,352,424 B2 4/2008 Searle
7,439,683 B2 10/2008 Emslie
7,473,173 B2 1/2009 Peterson et al.
7,505,049 B2 3/2009 Engel
7,510,475 B2 3/2009 Loose et al.
7,558,057 B1 7/2009 Naksen et al.
7,559,837 B1 7/2009 Yoseloff et al.
7,582,016 B2 9/2009 Suzuki
7,619,585 B2 11/2009 Bell et al.
7,624,339 B1 11/2009 Engel et al.
7,626,594 B1 12/2009 Witehira et al.
7,724,208 B1 5/2010 Engel et al.
7,730,413 B1 6/2010 Engel
7,742,124 B2 6/2010 Bell
7,742,239 B2 6/2010 Bell
7,841,944 B2 11/2010 Wells

(56) References Cited

U.S. PATENT DOCUMENTS

| | | | | |
|---|---|---|---|---|
| 7,951,001 | B2 | 5/2011 | Wells | |
| 8,012,010 | B2 | 9/2011 | Wilson et al. | |
| 8,115,700 | B2 | 2/2012 | Schlottmann et al. | |
| 8,118,670 | B2 | 2/2012 | Griswold et al. | |
| 8,142,273 | B2 | 3/2012 | Williams et al. | |
| 8,192,281 | B2 | 6/2012 | Williams et al. | |
| 8,199,068 | B2 | 6/2012 | Williams et al. | |
| 8,210,922 | B2 | 7/2012 | Williams et al. | |
| 2001/0013681 | A1 | 8/2001 | Bruzzese et al. | |
| 2001/0016513 | A1 | 8/2001 | Muir et al. | |
| 2001/0031658 | A1 | 10/2001 | Ozaki et al. | |
| 2001/0035868 | A1 | 11/2001 | Uehara et al. | |
| 2002/0004421 | A1 | 1/2002 | Itai | |
| 2002/0022518 | A1 | 2/2002 | Okuda et al. | |
| 2002/0045472 | A1 | 4/2002 | Adams | |
| 2002/0086725 | A1 | 7/2002 | Fasbender et al. | |
| 2002/0119035 | A1* | 8/2002 | Hamilton | 414/426 |
| 2002/0142825 | A1 | 10/2002 | Lark et al. | |
| 2002/0167637 | A1 | 11/2002 | Burke et al. | |
| 2002/0173354 | A1 | 11/2002 | Winans et al. | |
| 2002/0175466 | A1 | 11/2002 | Loose et al. | |
| 2002/0183105 | A1 | 12/2002 | Cannon | |
| 2002/0183109 | A1 | 12/2002 | McGahn et al. | |
| 2003/0026171 | A1 | 2/2003 | Brewer et al. | |
| 2003/0027624 | A1 | 2/2003 | Gilmore et al. | |
| 2003/0032478 | A1 | 2/2003 | Takahama et al. | |
| 2003/0032479 | A1 | 2/2003 | LeMay et al. | |
| 2003/0045345 | A1 | 3/2003 | Berman | |
| 2003/0060271 | A1 | 3/2003 | Gilmore et al. | |
| 2003/0064781 | A1 | 4/2003 | Muir | |
| 2003/0069063 | A1 | 4/2003 | Bilyeu et al. | |
| 2003/0087690 | A1* | 5/2003 | Loose et al. | 463/20 |
| 2003/0128427 | A1 | 7/2003 | Kalmanash et al. | |
| 2003/0130026 | A1 | 7/2003 | Breckner et al. | |
| 2003/0130028 | A1 | 7/2003 | Aida et al. | |
| 2003/0148804 | A1 | 8/2003 | Ikeya et al. | |
| 2003/0157980 | A1 | 8/2003 | Loose et al. | |
| 2003/0176214 | A1 | 9/2003 | Burak et al. | |
| 2003/0199295 | A1 | 10/2003 | Vancura | |
| 2003/0220134 | A1 | 11/2003 | Walker et al. | |
| 2003/0234489 | A1 | 12/2003 | Okada | |
| 2003/0236114 | A1 | 12/2003 | Griswold et al. | |
| 2003/0236118 | A1 | 12/2003 | Okada | |
| 2004/0002372 | A1 | 1/2004 | Rodgers et al. | |
| 2004/0009803 | A1 | 1/2004 | Bennett et al. | |
| 2004/0023714 | A1 | 2/2004 | Asdale | |
| 2004/0029636 | A1 | 2/2004 | Wells | |
| 2004/0036218 | A1 | 2/2004 | Inoue | |
| 2004/0048645 | A1 | 3/2004 | Webb et al. | |
| 2004/0048673 | A1 | 3/2004 | Kaminkow | |
| 2004/0053660 | A1 | 3/2004 | Webb et al. | |
| 2004/0063490 | A1 | 4/2004 | Okada | |
| 2004/0066475 | A1 | 4/2004 | Searle | |
| 2004/0077404 | A1 | 4/2004 | Schlottmann et al. | |
| 2004/0102244 | A1 | 5/2004 | Kryuchkov et al. | |
| 2004/0102245 | A1 | 5/2004 | Escalera et al. | |
| 2004/0116178 | A1 | 6/2004 | Okada | |
| 2004/0142748 | A1 | 7/2004 | Loose et al. | |
| 2004/0147303 | A1 | 7/2004 | Imura et al. | |
| 2004/0150162 | A1 | 8/2004 | Okada | |
| 2004/0162146 | A1 | 8/2004 | Ooto | |
| 2004/0166925 | A1 | 8/2004 | Emori et al. | |
| 2004/0166927 | A1 | 8/2004 | Okada | |
| 2004/0171423 | A1 | 9/2004 | Silva et al. | |
| 2004/0183251 | A1 | 9/2004 | Inoue | |
| 2004/0183972 | A1 | 9/2004 | Bell | |
| 2004/0192430 | A1 | 9/2004 | Burak et al. | |
| 2004/0198485 | A1 | 10/2004 | Loose | |
| 2004/0207154 | A1 | 10/2004 | Okada | |
| 2004/0209666 | A1 | 10/2004 | Tashiro | |
| 2004/0209667 | A1 | 10/2004 | Emori et al. | |
| 2004/0209668 | A1 | 10/2004 | Okada | |
| 2004/0209671 | A1* | 10/2004 | Okada | 463/20 |
| 2004/0209672 | A1* | 10/2004 | Okada | 463/20 |
| 2004/0209678 | A1 | 10/2004 | Okada | |
| 2004/0209683 | A1 | 10/2004 | Okada | |
| 2004/0214635 | A1 | 10/2004 | Okada | |
| 2004/0214637 | A1 | 10/2004 | Nonaka | |
| 2004/0219967 | A1 | 11/2004 | Giobbi et al. | |
| 2004/0224747 | A1 | 11/2004 | Okada | |
| 2004/0227721 | A1 | 11/2004 | Moilanen et al. | |
| 2004/0233663 | A1 | 11/2004 | Emslie et al. | |
| 2004/0235558 | A1 | 11/2004 | Beaulieu et al. | |
| 2004/0239582 | A1 | 12/2004 | Seymour | |
| 2004/0266515 | A1 | 12/2004 | Gauselmann | |
| 2004/0266536 | A1 | 12/2004 | Mattice et al. | |
| 2005/0020348 | A1* | 1/2005 | Thomas et al. | 463/20 |
| 2005/0026673 | A1 | 2/2005 | Paulsen et al. | |
| 2005/0032571 | A1 | 2/2005 | Asonuma | |
| 2005/0037843 | A1 | 2/2005 | Wells et al. | |
| 2005/0049032 | A1 | 3/2005 | Kobayashi | |
| 2005/0049033 | A1 | 3/2005 | Kojima | |
| 2005/0049046 | A1 | 3/2005 | Kobayashi | |
| 2005/0052341 | A1 | 3/2005 | Henriksson | |
| 2005/0062410 | A1 | 3/2005 | Bell et al. | |
| 2005/0063055 | A1 | 3/2005 | Engel | |
| 2005/0079913 | A1 | 4/2005 | Inamura | |
| 2005/0085292 | A1 | 4/2005 | Inamura | |
| 2005/0145366 | A1 | 7/2005 | Erel | |
| 2005/0153772 | A1 | 7/2005 | Griswold et al. | |
| 2005/0153775 | A1 | 7/2005 | Griswold et al. | |
| 2005/0164786 | A1 | 7/2005 | Connelly | |
| 2005/0176493 | A1 | 8/2005 | Nozaki et al. | |
| 2005/0192090 | A1 | 9/2005 | Muir et al. | |
| 2005/0206582 | A1 | 9/2005 | Bell et al. | |
| 2005/0208994 | A1 | 9/2005 | Berman | |
| 2005/0233799 | A1 | 10/2005 | LeMay et al. | |
| 2005/0239539 | A1 | 10/2005 | Inamura | |
| 2005/0253775 | A1 | 11/2005 | Stewart | |
| 2005/0255908 | A1 | 11/2005 | Wells et al. | |
| 2005/0266912 | A1 | 12/2005 | Sekiguchi | |
| 2005/0285337 | A1 | 12/2005 | Durham et al. | |
| 2006/0025199 | A1 | 2/2006 | Harkins et al. | |
| 2006/0058100 | A1 | 3/2006 | Pacey et al. | |
| 2006/0063580 | A1 | 3/2006 | Nguyen et al. | |
| 2006/0073881 | A1 | 4/2006 | Pryzby | |
| 2006/0100014 | A1 | 5/2006 | Griswold et al. | |
| 2006/0103951 | A1 | 5/2006 | Bell et al. | |
| 2006/0111179 | A1 | 5/2006 | Inamura | |
| 2006/0125745 | A1 | 6/2006 | Evanicky | |
| 2006/0166727 | A1 | 7/2006 | Burak | |
| 2006/0191177 | A1 | 8/2006 | Engel | |
| 2006/0256033 | A1 | 11/2006 | Chan et al. | |
| 2006/0284574 | A1 | 12/2006 | Emslie et al. | |
| 2006/0290594 | A1 | 12/2006 | Engel et al. | |
| 2007/0004510 | A1 | 1/2007 | Underdahl et al. | |
| 2007/0004513 | A1 | 1/2007 | Wells et al. | |
| 2007/0010315 | A1 | 1/2007 | Hein | |
| 2007/0057866 | A1 | 3/2007 | Lee et al. | |
| 2007/0072665 | A1 | 3/2007 | Muir | |
| 2007/0077986 | A1 | 4/2007 | Loose | |
| 2007/0091011 | A1 | 4/2007 | Selbrede | |
| 2007/0105610 | A1 | 5/2007 | Anderson | |
| 2007/0105611 | A1 | 5/2007 | O'Halloran | |
| 2007/0105628 | A1 | 5/2007 | Arbogast et al. | |
| 2007/0167208 | A1 | 7/2007 | Acres | |
| 2007/0252804 | A1 | 11/2007 | Engel et al. | |
| 2008/0004104 | A1 | 1/2008 | Durham et al. | |
| 2008/0007486 | A1 | 1/2008 | Fujinawa et al. | |
| 2008/0020816 | A1 | 1/2008 | Griswold et al. | |
| 2008/0020839 | A1 | 1/2008 | Wells et al. | |
| 2008/0020840 | A1 | 1/2008 | Wells et al. | |
| 2008/0020841 | A1 | 1/2008 | Wells et al. | |
| 2008/0064497 | A1 | 3/2008 | Griswold et al. | |
| 2008/0068290 | A1 | 3/2008 | Muklashy et al. | |
| 2008/0096655 | A1 | 4/2008 | Rasmussen et al. | |
| 2008/0108422 | A1 | 5/2008 | Hedrick et al. | |
| 2008/0113716 | A1 | 5/2008 | Beadell et al. | |
| 2008/0113745 | A1 | 5/2008 | Williams et al. | |
| 2008/0113746 | A1 | 5/2008 | Williams et al. | |
| 2008/0113747 | A1 | 5/2008 | Williams et al. | |
| 2008/0113748 | A1 | 5/2008 | Williams et al. | |
| 2008/0113749 | A1 | 5/2008 | Williams et al. | |
| 2008/0113756 | A1 | 5/2008 | Williams et al. | |

(56) References Cited

U.S. PATENT DOCUMENTS

| | | | |
|---|---|---|---|
| 2008/0113775 | A1 | 5/2008 | Williams et al. |
| 2008/0125219 | A1 | 5/2008 | Williams et al. |
| 2008/0136741 | A1 | 6/2008 | Williams et al. |
| 2008/0261674 | A9 | 10/2008 | Okada |
| 2008/0284792 | A1 | 11/2008 | Bell |
| 2009/0061983 | A1 | 3/2009 | Kaufman et al. |
| 2009/0061984 | A1 | 3/2009 | Yi et al. |
| 2009/0069069 | A1 | 3/2009 | Crowder, Jr. et al. |
| 2009/0069070 | A1 | 3/2009 | Crowder, Jr. et al. |
| 2009/0079667 | A1 | 3/2009 | Schlottmann et al. |
| 2009/0082083 | A1 | 3/2009 | Wilson et al. |
| 2009/0091513 | A1 | 4/2009 | Kuhn |
| 2009/0104989 | A1 | 4/2009 | Williams et al. |
| 2009/0111577 | A1 | 4/2009 | Mead |
| 2009/0117993 | A1 | 5/2009 | Bigelow, Jr. et al. |
| 2009/0258697 | A1 | 10/2009 | Kelly et al. |
| 2009/0258701 | A1 | 10/2009 | Crowder, Jr. et al. |
| 2009/0280888 | A1 | 11/2009 | Durham et al. |
| 2009/0312095 | A1 | 12/2009 | Durham et al. |
| 2010/0045601 | A1 | 2/2010 | Engel et al. |
| 2010/0048288 | A1 | 2/2010 | Canterbury et al. |
| 2010/0115391 | A1 | 5/2010 | Engel et al. |
| 2010/0115439 | A1 | 5/2010 | Engel |
| 2010/0190545 | A1 | 7/2010 | Lauzon et al. |
| 2010/0214195 | A1 | 8/2010 | Ogasawara et al. |
| 2010/0234089 | A1 | 9/2010 | Saffari et al. |
| 2011/0065490 | A1 | 3/2011 | Lutnick et al. |
| 2011/0201404 | A1 | 8/2011 | Wells |
| 2011/0294562 | A1 | 12/2011 | Wilson et al. |
| 2012/0034975 | A1 | 2/2012 | Silva et al. |

FOREIGN PATENT DOCUMENTS

| | | |
|---|---|---|
| CA | 2265283 | 9/1999 |
| CA | 2428858 | 5/2002 |
| CN | 1137651 | 12/1996 |
| CN | 1208210 | 2/1999 |
| EP | 0 454 423 | 10/1991 |
| EP | 0 484 103 | 5/1992 |
| EP | 0 860 807 | 8/1998 |
| EP | 0 919 965 | 6/1999 |
| EP | 0 997 857 | 5/2000 |
| EP | 1 000 642 | 5/2000 |
| EP | 1 260 928 | 11/2002 |
| EP | 1 282 088 | 2/2003 |
| EP | 1 369 830 | 12/2003 |
| EP | 1 391 847 | 2/2004 |
| EP | 1 462 152 | 9/2004 |
| EP | 1 465 126 | 10/2004 |
| EP | 1 492 063 | 12/2004 |
| EP | 1 571 626 | 9/2005 |
| EP | 1 762 992 | 3/2007 |
| EP | 1 826 739 | 8/2007 |
| GB | 1 464 896 | 2/1977 |
| GB | 2 120 506 | 11/1983 |
| GB | 2 239 547 | 7/1991 |
| GB | 2 253 300 | 9/1992 |
| GB | 2 316 214 | 2/1998 |
| GB | 2 385 004 | 8/2003 |
| JP | H02-90884 | 7/1990 |
| JP | H03-20388 | 2/1991 |
| JP | 04-220276 | 8/1992 |
| JP | H05-68585 | 9/1993 |
| JP | 06-043425 | 2/1994 |
| JP | 07-124290 | 5/1995 |
| JP | H10-015247 | 1/1998 |
| JP | 10-234932 | 9/1998 |
| JP | 11-000441 | 1/1999 |
| JP | H11-137852 | 5/1999 |
| JP | 2000-245963 | 9/2000 |
| JP | 2000-300729 | 10/2000 |
| JP | 2000-350805 | 12/2000 |
| JP | 2000-354685 | 12/2000 |
| JP | 2001-062032 | 3/2001 |
| JP | 2001-238995 | 9/2001 |
| JP | 2001-252393 | 9/2001 |
| JP | 2001-252394 | 9/2001 |
| JP | 2001-353254 | 12/2001 |
| JP | 2002-085624 | 3/2002 |
| JP | 2004-089707 | 3/2004 |
| JP | 2004-105616 | 4/2004 |
| JP | 2004-166879 | 6/2004 |
| JP | 2004-350869 | 12/2004 |
| JP | 2005-253561 | 9/2005 |
| JP | 2005-266387 | 9/2005 |
| JP | 2005-266388 | 9/2005 |
| JP | 2005-274906 | 10/2005 |
| JP | 2005-274907 | 10/2005 |
| JP | 2005-283864 | 10/2005 |
| JP | 2006-043425 | 2/2006 |
| JP | 2006-059607 | 3/2006 |
| JP | 2006-346226 | 12/2006 |
| JP | 2007-200869 | 8/2007 |
| RU | 2 053 559 | 1/1996 |
| RU | 2 145 116 | 1/2000 |
| RU | 29794 | 5/2003 |
| WO | WO 93/13446 | 7/1993 |
| WO | WO 99/42889 | 8/1999 |
| WO | WO 99/44095 | 9/1999 |
| WO | WO 99/53454 | 10/1999 |
| WO | WO 00/32286 | 6/2000 |
| WO | WO 01/15127 | 3/2001 |
| WO | WO 01/15128 | 3/2001 |
| WO | WO 01/15132 | 3/2001 |
| WO | WO 01/38926 | 5/2001 |
| WO | WO 01/09664 | 8/2001 |
| WO | WO 02/38234 | 5/2002 |
| WO | WO 02/41046 | 5/2002 |
| WO | WO 02/084637 | 10/2002 |
| WO | WO 02/086610 | 10/2002 |
| WO | WO 02/089102 | 11/2002 |
| WO | WO 03/001486 | 1/2003 |
| WO | WO 03/023491 | 3/2003 |
| WO | WO 03/032058 | 4/2003 |
| WO | WO 03/039699 | 5/2003 |
| WO | WO 03/040820 | 5/2003 |
| WO | PCT/NZ2003/00153 | 7/2003 |
| WO | WO 03/079094 | 9/2003 |
| WO | WO 04/001486 | 12/2003 |
| WO | WO 04/001488 | 12/2003 |
| WO | WO 04/002143 | 12/2003 |
| WO | WO 2004/008226 | 1/2004 |
| WO | WO 2004/023825 | 3/2004 |
| WO | WO 2004/025583 | 3/2004 |
| WO | WO 2004/036286 | 4/2004 |
| WO | WO 2004/060512 | 7/2004 |
| WO | WO 2004/079674 | 9/2004 |
| WO | WO 2004/102520 | 11/2004 |
| WO | WO 2005/071629 | 8/2005 |
| WO | WO 2006/034192 | 3/2006 |
| WO | WO 2006/038819 | 4/2006 |
| WO | WO 2006/112740 | 10/2006 |
| WO | WO 2007/040413 | 4/2007 |
| WO | WO 2008/005278 | 1/2008 |
| WO | WO 2008/028153 | 3/2008 |
| WO | WO 2008/048857 | 4/2008 |
| WO | WO 2008/061068 | 5/2008 |
| WO | WO 2008/062914 | 5/2008 |
| WO | WO 2008/063908 | 5/2008 |
| WO | WO 2008/063914 | 5/2008 |
| WO | WO 2008/063952 | 5/2008 |
| WO | WO 2008/063956 | 5/2008 |
| WO | WO 2008/063968 | 5/2008 |
| WO | WO 2008/063969 | 5/2008 |
| WO | WO 2008/063971 | 5/2008 |
| WO | WO 2008/079542 | 7/2008 |
| WO | WO 2009/029720 | 3/2009 |
| WO | WO 2009/039245 | 3/2009 |
| WO | WO 2009/039295 | 3/2009 |

(56) References Cited

FOREIGN PATENT DOCUMENTS

| | | |
|---|---|---|
| WO | WO 2009/054861 | 4/2009 |
| WO | WO 2010/023537 | 3/2010 |
| WO | WO 2010/039411 | 4/2010 |

OTHER PUBLICATIONS

US Office Action Final dated Aug. 19, 2010 issued in U.S. Appl. No. 11/938,086.
US Office Action dated Dec. 3, 2010 issued in U.S. Appl. No. 11/938,086.
US Notice of Allowance dated Apr. 18, 2011 issued in U.S. Appl. No. 11/938,086.
US Notice of Allowance dated Oct. 7, 2011 issued in U.S. Appl. No. 11/938,086.
U.S. Office Action dated Oct. 9, 2009 issued in U.S. Appl. No. 11/514,808.
U.S. Office Action Final dated Apr. 22, 2010 issued in U.S. Appl. No. 11/514,808.
U.S. Office Action and Examiner Interview Summary dated Oct. 18, 2010 issued in U.S. Appl. No. 11/514,808.
U.S. Office Action Final dated Apr. 27, 2011 issued in U.S. Appl. No. 11/514,808.
U.S. Office Action dated Dec. 2, 2009 issued in U.S. Appl. No. 11/829,852.
U.S. Office Action dated Jul. 14, 2010 issued in U.S. Appl. No. 11/829,852.
U.S. Office Action dated Nov. 14, 2008 issued in U.S. Appl. No. 11/829,853.
U.S. Office Action dated Oct. 31, 2008 issued in U.S. Appl. No. 11/829,849.
US Office Action dated Aug. 29, 2007 issued in U.S. Appl. No. 10/755,598.
US Office Action Final dated Apr. 23, 2008 issued in U.S. Appl. No. 10/755,598.
US Office Action dated Oct. 8, 2008 issued in U.S. Appl. No. 10/755,598.
US Office Action Final dated Jul. 1, 2009 issued in U.S. Appl. No. 10/755,598.
US Office Action Final dated Jan. 22, 2010 issued in U.S. Appl. No. 10/755,598.
US Office Action Final dated Aug. 4, 2010 issued in U.S. Appl. No. 10/755,598.
US Notice of Panel Decision from Pre-Appeal Brief Review dated Dec. 1, 2010 issued in U.S. Appl. No. 10/755,598.
US Office Action dated Mar. 28, 2011 issued in U.S. Appl. No. 10/755,598.
US Office Action Final dated Nov. 8, 2011 issued in U.S. Appl. No. 10/755,598.
US Office Action dated Oct. 31, 2008 issued in U.S. Appl. No. 11/829,917.
US Office Action Final dated Aug. 11, 2009 issued in U.S. Appl. No. 11/829,917.
US Office Action dated Jan. 29, 2010 issued in U.S. Appl. No. 11/829,917.
US Office Action Final dated Aug. 5, 2010 issued in U.S. Appl. No. 11/829,917.
U.S. Office Action dated Jun. 23, 2009 issued in U.S. Appl. No. 11/938,151.
U.S. Office Action Final dated Feb. 8, 2010 issued in U.S. Appl. No. 11/938,151.
U.S. Advisory Action dated Apr. 22, 2010 issued in U.S. Appl. No. 11/938,151.
U.S. Office Action dated Jul. 23, 2010 issued in U.S. Appl. No. 11/938,151.
U.S. Office Action Final dated Jan. 4, 2011 issued in U.S. Appl. No. 11/938,151.
U.S. Office Action (Notice of Panel Decision from Pre-Appeal Brief Review) dated Apr. 27, 2011 issued in U.S. Appl. No. 11/938,151.
U.S. Notice of Allowance dated Sep. 12, 2011 issued in U.S. Appl. No. 11/938,151.
U.S. Allowed Claims dated Sep. 12, 2011 issued in U.S. Appl. No. 11/938,151.
U.S. Notice of Allowance and Allowability dated Jan. 9, 2012 issued in U.S. Appl. No. 11/938,151.
U.S. Amendment After Allowance—Rule 1.312 dated Jan. 26, 2012 issued in U.S. Appl. No. 11/938,151.
U.S. Office Action dated Jul. 9, 2010 issued in U.S. Appl. No. 11/858,849.
U.S. Office Action Final dated Nov. 30, 2010 issued in U.S. Appl. No. 11/858,849.
U.S. Office Action dated Mar. 22, 2011 issued in U.S. Appl. No. 11/858,849.
U.S. Office Action Final dated Aug. 11, 2011 issued in U.S. Appl. No. 11/858,849.
U.S. Office Action (Advisory Action) dated Dec. 2, 2011 issued in U.S. Appl. No. 11/858,849.
U.S. Notice of Allowance and Allowability dated Dec. 14, 2011 issued in U.S. Appl. No. 11/858,849.
U.S. Office Action dated Jul. 9, 2009 issued in U.S. Appl. No. 11/858,700.
U.S. Office Action Final dated Jan. 4, 2010 issued in U.S. Appl. No. 11/858,700.
U.S. Office Action Final dated Apr. 7, 2010 issued in U.S. Appl. No. 11/858,700.
U.S. Office Action dated Aug. 5, 2010 issued in U.S. Appl. No. 11/858,700.
U.S. Office Action Final dated Dec. 27, 2010 issued in U.S. Appl. No. 11/858,700.
U.S. Office Action dated Nov. 18, 2011 issued in U.S. Appl. No. 11/858,700.
U.S. Office Action dated Apr. 25, 2012 issued in U.S. Appl. No. 11/858,700.
U.S. Office Action dated Jul. 9, 2009 issued in U.S. Appl. No. 11/858,695.
U.S. Office Action Final dated Jan. 4, 2010 issued in U.S. Appl. No. 11/858,695.
U.S. Office Action Final dated Mar. 29, 2010 issued in U.S. Appl. No. 11/858,695.
U.S. Office Action Final dated Jul. 7, 2010 issued in U.S. Appl. No. 11/858,695.
U.S. Office Action dated Nov. 28, 2011 issued in U.S. Appl. No. 11/858,695.
U.S. Notice of Allowance dated Apr. 25, 2012 issued in U.S. Appl. No. 11/858,695.
U.S. Allowed Claims dated Apr. 25, 2012 issued in U.S. Appl. No. 11/858,695.
U.S. Office Action dated Apr. 28, 2011 issued in U.S. Appl. No. 11/858,793.
U.S. Notice of Allowance dated Oct. 12, 2011 issued in U.S. Appl. No. 11/858,793.
U.S. Allowed Claims dated Oct. 12, 2011 issued in U.S. Appl. No. 11/858,793.
U.S. Notice of Allowance dated Feb. 1, 2012 issued in U.S. Appl. No. 11/858,793.
U.S. Office Action dated Jul. 9, 2009 issued in U.S. Appl. No. 11/858,693.
U.S. Office Action Final dated Mar. 23, 2010 issued in U.S. Appl. No. 11/858,693.
U.S. Advisory Action dated Jun. 1, 2010 issued in U.S. Appl. No. 11/858,693.
U.S. Office Action dated Aug. 5, 2010 issued in U.S. Appl. No. 11/858,693.
U.S. Office Action Final dated Feb. 7, 2011 issued in U.S. Appl. No. 11/858,693.
U.S. Advisory Action dated Apr. 8, 2011 issued in U.S. Appl. No. 11/858,693.
U.S. Notice of Allowance dated Nov. 21, 2011 issued in U.S. Appl. No. 11/858,693.
U.S. Allowed Claims dated Nov. 21, 2011 issued in U.S. Appl. No. 11/858,693.

(56) References Cited

OTHER PUBLICATIONS

U.S. Notice of Allowance dated Feb. 29, 2012 issued in U.S. Appl. No. 11/858,693.
U.S. Office Action dated Jul. 10, 2009 issued in U.S. Appl. No. 11/858,845.
U.S. Office Action Final dated Feb. 5, 2010 issued in U.S. Appl. No. 11/858,845.
U.S. Notice of Panel Decision from Pre-Appeal Brief Review dated Jun. 8, 2010 issued in U.S. Appl. No. 11/858,845.
U.S. Office Action dated May 1, 2012 issued in U.S. Appl. No. 11/858,845.
U.S. Office Action dated Apr. 7, 2011 issued in U.S. Appl. No. 11/849,119.
U.S. Office Action Final dated Sep. 6, 2011 issued in U.S. Appl. No. 11/849,119.
U.S. Office Action dated Nov. 12, 2010 issued in U.S. Appl. No. 11/859,127.
U.S. Notice of Allowance dated May 4, 2011 issued in U.S. Appl. No. 11/859,127.
Third Party Submission for U.S. Appl. No. 13/207,260 dated Jan. 31, 2012.
U.S. Notice of Allowance dated Jun. 1, 2012 issued in U.S. Appl. No. 13/207,260.
U.S. Allowed Claims dated Jun. 1, 2012 issued in U.S. Appl. No. 13/207,260.
U.S. Office Action dated Jan. 20, 2011 issued in U.S. Appl. No. 11/983,770.
U.S. Office Action Final dated May 16, 2011 issued in U.S. Appl. No. 11/983,770.
U.S. Office Action dated Jan. 20, 2012 issued in U.S. Appl. No. 11/877,611.
U.S. Office Action dated Jun. 13, 2003 issued in U.S. Appl. No. 09/966,851.
U.S. Office Action dated Mar. 30, 2004 issued in U.S. Appl. No. 09/966,851.
U.S. Office Action Final dated Dec. 14, 2004 issued in U.S. Appl. No. 09/966,851.
U.S. Notice of Allowance dated Jun. 13, 2006 issued in U.S. Appl. No. 09/966,851.
U.S. Office Action dated Sep. 9, 2009 issued in U.S. Appl. No. 11/549,258.
U.S. Office Action Final dated Mar. 26, 2010 issued in U.S. Appl. No. 11/549,258.
U.S. Office Action dated Jul. 9, 2010 issued in U.S. Appl. No. 11/549,258.
U.S. Office Action Final dated Dec. 21, 2010 issued in U.S. Appl. No. 11/549,258.
U.S. Office Action dated Oct. 4, 2011 issued in U.S. Appl. No. 11/549,258.
U.S. Office Action dated Sep. 3, 2010 issued in U.S. Appl. No. 11/938,632.
U.S. Office Action Final dated Dec. 15, 2010 issued in U.S. Appl. No. 11/938,632.
U.S. Advisory Action dated Mar. 16, 2011 issued in U.S. Appl. No. 11/938,632.
U.S. Notice of Allowance dated May 27, 2011 issued in U.S. Appl. No. 11/938,632.
U.S. Notice of Allowance dated Oct. 5, 2011 issued in U.S. Appl. No. 11/938,632.
U.S. Notice of Allowance dated Jan. 25, 2012 issued in U.S. Appl. No. 11/938,632.
U.S. Office Action dated Jun. 23, 2009 issued in U.S. Appl. No. 11/938,184.
U.S. Office Action Final dated Feb. 8, 2010 issued in U.S. Appl. No. 11/938,184.
U.S. Office Action dated Aug. 5, 2010 issued in U.S. Appl. No. 11/938,184.
U.S. Office Action Final dated Jan. 20, 2011 issued in U.S. Appl. No. 11/938,184.
US Office Action dated Nov. 17, 2004 issued in U.S. Appl. No. 10/376,852.
US Office Action dated Apr. 13, 2005 issued in U.S. Appl. No. 10/376,852.
US Office Action Final dated Nov. 18, 2005 issued in U.S. Appl. No. 10/376,852.
US Advisory Action dated Feb. 7, 2006 issued in U.S. Appl. No. 10/376,852.
US Office Action dated Sep. 19, 2006 issued in U.S. Appl. No. 10/376,852.
US Notice of Informal or Non-Responsive Amendment dated Mar. 9, 2007 issued in U.S. Appl. No. 10/376,852.
US Office Action Final dated Jun. 22, 2007 issued in U.S. Appl. No. 10/376,852.
US Office Action dated Jan. 28, 2008 issued in U.S. Appl. No. 10/376,852.
US Office Action Final dated Aug. 6, 2008 issued in U.S. Appl. No. 10/376,852.
US Office Action dated Feb. 2, 2009 issued in U.S. Appl. No. 10/376,852.
US Notice of Allowance dated Nov. 10, 2009 issued in U.S. Appl. No. 10/376,852.
US Office Action dated Mar. 25, 2010 issued in U.S. Appl. No. 10/376,852.
U.S. Office Action dated Mar. 1, 2012 issued in U.S. Appl. No. 12/849,284.
Third Party Submission for U.S. Appl. No. 12/849,284 dated Apr. 9, 2012.
U.S. Office Action dated Aug. 31, 2004 issued in U.S. Appl. No. 10/213,626.
U.S. Office Action Final dated Jan. 10, 2006 issued in U.S. Appl. No. 10/213,626.
U.S. Office Action dated Apr. 27, 2006 issued in U.S. Appl. No. 10/213,626.
U.S. Office Action Final dated Mar. 28, 2007 issued in U.S. Appl. No. 10/213,626.
U.S. Office Action dated Oct. 31, 2007 issued in U.S. Appl. No. 10/213,626.
U.S. Office Action Final dated Aug. 29, 2008 issued in U.S. Appl. No. 10/213,626.
U.S. Office Action dated Jul. 9, 2009 issued in U.S. Appl. No. 10/213,626.
U.S. Notice of Allowance and Examiner Interview Summary dated Mar. 1, 2010 issued in U.S. Appl. No. 10/213,626.
U.S. Notice of Allowance dated Jun. 22, 2010 issued in U.S. Appl. No. 10/213,626.
U.S. Notice of Allowance dated Oct. 4, 2010 issued in U.S. Appl. No. 10/213,626.
U.S. Office Action dated May 24, 2007 issued in U.S. Appl. No. 11/167,655.
U.S. Office Action dated Jan. 3, 2008 issued in U.S. Appl. No. 11/167,655.
U.S. Office Action Final dated Mar. 8, 2008 issued in U.S. Appl. No. 11/167,655.
U.S. Office Action Final dated Sep. 2, 2008 issued in U.S. Appl. No. 11/167,655.
U.S. Office Action dated Jul. 17, 2009 issued in U.S. Appl. No. 11/167,655.
U.S. Notice of Allowance dated Mar. 11, 2010 issued in U.S. Appl. No. 11/167,655.
U.S. Notice of Allowance dated Jul. 7, 2010 issued in U.S. Appl. No. 11/167,655.
U.S. Notice of Allowance dated Dec. 10, 2010 issued in U.S. Appl. No. 11/167,655.
U.S. Notice of Allowance dated Apr. 1, 2011 issued in U.S. Appl. No. 11/167,655.
Third Party Submission filed for U.S. Appl. No. 13/094,259 dated Oct. 18, 2011.
PCT International Search Report dated Apr. 9, 2008 issued in WO 2008/028153.
PCT Written Opinion dated Apr. 9, 2008 issued in WO 2008/028153.
PCT International Preliminary Report on Patentability and Written Opinion dated Mar. 3, 2009 issued in WO 2008/028153.

(56) References Cited

OTHER PUBLICATIONS

Australian Examiner's first report dated Jul. 25, 2011 issued in AU 2007289050.
European Examination Report dated Oct. 5, 2009 issued in EP 07 814 629.7.
PCT International Search Report dated Dec. 7, 2009 issued in WO 2010/039411.
PCT International Search Report dated May 25, 2005 issued in WO 2005/071629.
PCT Written Opinion dated May 25, 2005 issued in WO 2005/071629.
PCT International Preliminary Report on Patentability and Written Opinion dated Jul. 17, 2006 issued in WO 2005/071629.
Australian Examiner's First Report dated Nov. 12, 2009 issued in AU2005207309.
Australian Examiner's Report No. 2 dated Sep. 15, 2010 issued in AU Application No. 2005207309.
Chinese First Office Action dated Nov. 28, 2008 issued in CN2005800022940.
Chinese Second Office Action dated Sep. 25, 2009 issued in CN2005800022940.
Chinese Third Office Action dated May 11, 2010 issued in CN2005800022940.
EP Examination Report dated Sep. 13, 2007 issued in EP 05 705 315.9.
Mexican Office Action (as described by foreign attorney) dated Jun. 18, 2009 issued for MX 06/07950.
Russian Examination and Resolution on Granting Patent dated Jul. 18, 2008 issued in RU 2006-128289-09.
PCT International Search Report dated May 2, 2008 issued in WO 2008/061068.
PCT Written Opinion dated May 2, 2008 issued in WO 2008/061068.
PCT International Preliminary Report on Patentability and Written Opinion dated May 12, 2009 issued in WO 2008/061068.
Australian Examiner's first report dated Jul. 7, 2011 issued in AU 2007319331.
EP Examination Report dated Oct. 28, 2009 issued in EP 07 845 059.0 1238.
PCT International Search Report dated May 20, 2008 issued in WO 2008/063952.
PCT International Search Report and Written Opinion dated May 20, 2008 issued in WO 2008/063952.
PCT International Preliminary Report on Patentability and Written Opinion dated May 19, 2009 issued in WO 2008/063952.
Australian Examiner's first report dated Aug. 2, 2011 issued in AU 2007323945.
Australian Examiner's report No. 2 dated Feb. 10, 2012 issued in AU 2007323945.
European Examination Report dated Oct. 28, 2009 issued in EP 07 864 281.6.
PCT International Search Report dated Dec. 18, 2008 issued in WO 2009/039245.
PCT Written Opinion dated Dec. 18, 2008 issued in WO 2009/039245.
PCT International Preliminary Report on Patentability and Written Opinion dated Mar. 24, 2010 issued in WO 2009/039245.
PCT International Search Report dated May 7, 2008 issued in WO 2008/063914.
PCT Written Opinion dated May 7, 2008 issued in WO 2008/063914.
PCT International Preliminary Examination Report on Patentability and Written Opinion dated May 19, 2009 issued in WO 2008/063914.
Australian Examiner's first report dated Jul. 25, 2011 issued in AU 2007324000.
European Examination Report dated Oct. 28, 2009 issued in EP 07 844 998.0.
PCT International Search Report dated May 14, 2008 issued in WO 2008/063956.
PCT Written Opinion dated May 14, 2008 issued in WO 2008/063956.
PCT International Preliminary Report on Patentability and Written Opinion dated May 19, 2009 issued in WO 2008/063956.
Australian Examiner's First Report dated Aug. 4, 2011 issued in AU 2007323949.
Australian Patent Examination Report No. 2 dated Jun. 27, 2012 issued in AU 2007323949.
PCT International Search Report dated May 8, 2008 issued in issued in WO 2008/063908.
PCT Written Opinion dated May 8, 2008 issued in issued in WO 2008/063908.
PCT International Preliminary Report on Patentability and Written Opinion dated May 19, 2009 issued in WO 2008/063908.
Australian Examiner's first report dated Jul. 25, 2011 issued in AU 2007323994.
PCT International Search Report dated Jun. 11, 2008 issued in WO 2008/079542.
PCT Written Opinion dated Jun. 11, 2008 issued in WO 2008/079542.
PCT International Preliminary Report on Patentability and Written Opinion dated May 19, 2009 issued in WO 2008/079542.
Australian Examiner's first report dated Aug. 2, 2011 issued in AU 2007338512.
European Examination Report dated Oct. 28, 2009 issued in EP 07 872 343.4.
PCT International Search Report dated May 20, 2008 issued in WO 2008/063971.
PCT Written Opinion dated May 20, 2008 issued in WO 2008/063971.
PCT International Preliminary Report on Patentability and Written Opinion dated May 19, 2009 issued in WO 2008/063971.
Australian Examiner's first report dated Aug. 2, 2011 issued in AU 2007323964.
Australian Patent Examination Report No. 2 dated Jul. 11, 2012 issued in AU 2007323964.
European Examination Report dated Oct. 28, 2009 issued in EP 07 845 062.4.
PCT International Search Report dated Dec. 11, 2008 issued in WO 2009/039295.
PCT Written Opinion dated Dec. 11, 2008 issued in WO 2009/039295.
PCT International Preliminary Report on Patentability and Written Opinion dated Mar. 24, 2010 issued in WO 2009/039295.
PCT International Search Report dated Jul. 16, 2008 issued in WO2009/054861.
PCT Written Opinion dated Jul. 16, 2008 issued in WO2009/054861.
PCT International Preliminary Report on Patentability and Written Opinion dated Apr. 27, 2010 issued in WO 2009/054861.
Australian Examiner's First Report dated Sep. 22, 2005 issued in AU 29246/02.
Australian Notice of Opposition by Aristocrat Technologies dated Apr. 8, 2009 issued in AU 2007200982.
Australian Statement of Grounds and Particulars in Support of Opposition by Aristocrat Technologies dated Jul. 6, 2009 issued in AU 2007200982.
Australian Withdrawal of Opposition by Aristocrat Technologies dated Aug. 12, 2009 issued in AU 2007200982.
PCT International Search Report and Written Opinion dated May 9, 2008 issued in for WO 2008/048857.
PCT Written Opinion dated May 9, 2008 issued in WO 2008/048857.
PCT International Preliminary Report on Patentability and Written Opinion dated Apr. 15, 2009 issued in WO2008/048857.
Australian Examiner's first report dated Nov. 30, 2011 issued in AU2007312986.
European Examination Report dated Sep. 10, 2009 issued in EP 07 853 965.7.
PCT International Search Report dated May 20, 2008 issued in WO2008/063969.
PCT Written Opinion dated May 20, 2008 issued in WO 2008/063969.
PCT International Preliminary Report on Patentability and Written Opinion dated May 19, 2009 issued in WO 2008/063969.
Australian Examiner's first report dated Aug. 19, 2011 issued in AU2007323962.

(56) References Cited

OTHER PUBLICATIONS

Australian Examiner's report No. 2 dated Feb. 24, 2012 issued in AU2007323962.
PCT International Search Report dated Jul. 21, 2008 issued in WO 2008/063968.
PCT Written Opinion dated Jul. 21, 2008 issued in WO 2008/063968.
PCT International Preliminary Report on Patentability and Written Opinion dated May 19, 2009 issued in WO 2008/063968.
Australian Examiner's first report dated Jul. 29, 2011 issued in AU 2007323961.
European Examination Report dated Oct. 28, 2009 issued in EP 07 854 617.3.
PCT International Search Report dated Jun. 15, 2004 issued in WO 2004/07974.
PCT International Preliminary Report on Patentability and Written Opinion dated Sep. 2, 2005 issued in WO 2004/07974.
Australian Examiner's First Report dated May 17, 2007 issued in AU 2004216952.
Australian Examiner's Report No. 2 dated Jul. 30, 2007 issued in AU 2004216952.
Australian Examiner's Report No. 3 dated May 28, 2008 issued in AU 2004216952.
Japanese Description of Office Action dated Jul. 4, 2006 issued in Application No. 2005-518567.
Japanese Description of Office Action Final dated Apr. 10, 2007 issued in Application No. 2005-518567.
Japanese Description of Office Action (interrogation) dated May 25, 2009 issued by an Appeal Board in Application No. 2005-518567.
European Extended Search Report dated Jan. 26, 2012 issued in EP 11 17 6202.
European Communication dated Mar. 5, 2012 issued in EP 11 17 6202.
GB Combined Search and Examination Report dated Nov. 18, 2011 issued in GB1113207.3.
Australian Examiner's First Report dated Apr. 5, 2005 issued in AU2003227286.
Australian Examination Report (as described by Applicant's Attorney) dated Feb. 26, 2009 issued in AU2003227286.
Australian Re-Examination Report dated May 1, 2009 issued in AU2003227286.
Australian Examiner Communication regarding Claims dated Nov. 24, 2009 issued in AU2003227286.
Australian Notice of Acceptance with Exam Comments dated Jan. 28, 2010 issued in AU2003227286.
Australian Examiner's First Report dated Jul. 23, 2007 issued in AU2006203570.
Australian Notice of Acceptance with Examiner's Comments dated Nov. 15, 2007 issued in AU2006202570.
Australian Re-Examination Report (No. 1) dated Dec. 2, 2009 issued in AU2006203570.
Australian Examiner Communication dated Feb. 5, 2010 issued in AU 2006203570.
Australian Re-Examination Report (No. 2) dated Feb. 8, 2010 issued in AU 2006203570.
Bonsor, Kevin (2002), "How Smart Windows Will Work," *Howstuffworks, Inc.* 1998-2002, [retrieved from the Internet on Nov. 25, 2002] at http://www/howstuffworks.com/smart-window.htm/printable, 5 pgs.
Bonser, Kevin (2004) "How Smart Windows Work," *HowStuffWorks, Inc.*, 1998-2004, retrieved from the Internet on Apr. 1, 2004 at http://www.howstuffworks.com, 9 pgs.
Debut of the Let's Make a Deal Slot Machine (2002), *The Official Let's Make A Deal Website* at www.letsmakeadeal.com, 1999-2002, modified Jan. 2, 2002; downloaded from Internet on Dec. 3, 2002 at http:///www.letsmakeadeal.com/pr01.htm, 2 pgs.
Light Valve (2005), www.meko.co.uk, [retrieved from the Internet on Nov. 15, 2005] at http://www.meko.co.uk/lightvalve.shtml, 1 page.
Liquid Crystal Display (2005), Wikipedia.org, [retrieved from the Internet on Nov. 16, 2005] at http://en.wikipedia.org/wiki/LCD, 6 pgs.
"Living in a flat world?" Deep Video Imaging Ltd. Marketing Brochure, published in 2000 (full date unknown), 8 pgs.
Newton, Harry, Newton's Telecom Dictionary, Jan. 1998, Telecom Books and Flatiron Publishing, p. 399.
Novel 3-D Video Display Technology Developed, News release on Aug. 30, 1996; [Retrieved from Internet at http://www.eurekalert.org/ summaries/1199.html (archive) on Sep. 2, 2000; Feb. 14, 2003], 2 page.
"Pointer Ballistics for Windows XP.pdf" (Oct. 31, 2002), *Microsoft*, [downloaded on Aug. 27, 2010 from http://www.microsoft.com/whdc/archive/pointer-bal.mspx], 3 pages.
Police 911, *Wikipedia*, Jan. 22, 2002, retrieved from Internet at http://en.wilkipedia.org/widi/Police_911 on Oct. 28, 2007, 4 pgs.
Saxe et al. (1996) "Suspended-Particle Devices," Refr-spd.com, retrieved from the Internet on Apr. 1, 2004 at http://www.refr-spd.com, vol. Information Display Apr./May 1996, 5 pgs.
SPD (1999), *Malvino Inc.*, retrieved from the Internet on Jul. 19, 1999 at http://www.malvino.com, 10 pgs.
Stic Search History, Patent Literature Bibliographic Databases, in a US Office Action dated Jul. 23, 2010 issued in U.S. Appl. No. 11/938,151, 98 pages.
Time Multiplexed Optical Shutter (TMOS): A revolutionary Flat Screen Display Technology, www.tralas.com/TMOS.html, Apr. 5, 2001, printed from Internet Archive using date Apr. 11, 2001; 5 pgs.
Time Multiplexed Optical Shutter (TMOS): A revolutionary Flat Screen Display Technology, www.vea.com/TMOS.html, Apr. 8, 1999, printed from Internet Archive using date Oct. 6, 1999; 6 pgs.
What is SPD? (2002), www.SPD Systems, Inc., [retrieved from the Internet on Dec. 4, 2002] at http://www.spd-systems.com/spdq.htm, 2 pgs.

* cited by examiner

REEL AND VIDEO COMBINATION MACHINE

CROSS REFERENCE TO RELATED APPLICATIONS

This application is a continuation in part claiming priority from U.S. patent application Ser. No. 11/514,808 filed Sep. 1, 2006 by Wells et al., which application is a continuation in part of a) commonly owned and co-pending U.S. patent application Ser. No. 10/213,626 entitled "Gaming Device Having a Three Dimensional Display Device," filed Aug. 6, 2002, and b) commonly owned and co-pending U.S. patent application Ser. No. 10/755,598 entitled "Multiple-State Display For a Gaming Apparatus," filed Jan. 12, 2004. Each of the above patent applications is incorporated herein by reference for all purposes.

BACKGROUND

This invention relates to gaming machines. In particular, the invention relates to gaming machines with layered displays disposed along a common line of sight.

Over the past few years, the experience of players using gaming machines has changed dramatically. For example, the hand pulled lever used to initiate game play is being replaced with a push button located beneath a main display on gaming machines. In addition, cashless gaming machines are becoming prevalent. When a player wins a game played on a cashless machine, he or she can cash out by pushing a button and the machine will print out a cashless ticket or other voucher. Still further, video display screens are now used to present all manner of games on gaming machines including video poker games, keno, etc. However, slot machines still often use mechanical stepper reels.

Video display screens represented an important advance by reducing moving parts in gaming machines, greatly increasing the range of different game types that could be played on gaming machines. By now, however, video display screens have begun to lose their novelty and ability to elicit a "gee whiz" player response. Part of this has to do with just how ubiquitous video display screens have become in all areas of personal and commercial life; they are found at airport kiosks, home computers, appliance readouts, etc.

Further, some players still prefer the look and "feel" of conventional rotating stepper reels in slot machines. Currently deployed gaming machine video displays provide a poor rendition of the three-dimensional look and feel of a "real" mechanical slot machine. As a consequence, casinos and other gaming establishments that rely on video slot machines may lose valuable opportunities to entice all players and potential players.

It should also be noted that current video gaming machines commonly employ multiple display devices to output video data. For example, some conventional gaming machines include an LCD panel disposed in a central part of the gaming machine for presenting a game, while a secondary and smaller LCD panel in a top box of the gaming machine provides bonus game or other information.

Upper and lower, side-by-side, or other separate display screen arrangements require a player to move his or her focus back and forth from one from one screen to another. This may lead to player distraction, which at a minimum reduces opportunities for generating excitement among casino patrons. In a worse case, a player may become frustrated or tired with the gaming machine and simply refuse to use it again.

In view of the above, it would be desirable to have improved modes of presenting information about wins on gaming machines.

SUMMARY

The invention described herein provides methods, systems, and apparatus for displaying games or other information in multiple formats on apparatus such as gaming machines. The information is provided on at least two different display devices such as reels and video displays. The different display devices may be moved into and out of position with respect to one another, and to a player's line of sight, during game play. In some embodiments, the video displays are substantially flat, while the reels are mechanical spinning reels, although they may be video reels formed on a curved display such as a curved video display configured to depict spinning reels.

One aspect of the invention provides apparatus such as a gaming machine that may include the following features: (a) an external cabinet defining an interior region of the gaming machine; (b) a processor configured to execute instructions from memory that permit game play on the gaming machine; (c) one or more reels or a reel display mounted to or within the external cabinet; (d) a video display device positioned in front of and along a common line of sight with respect to the reels or reel display such that a player, while positioned for playing a game on the gaming machine, can view either of both of the video display device and the reels or reel display along the common line of sight; and (e) a mechanism for moving at least one of the video display device and the reels or reel display into and out of position along the common line of sight. It should be understood that the external cabinet is typically adapted to house a plurality of gaming machine components within or about the interior region.

In some embodiments, the gaming machine also includes game presentation logic for execution on the processor to present video information on the video display device pertinent to said game play on the gaming machine. The game presentation logic may also determine whether the video display device or the reels should be active at any given time for presenting game information. Typically, the game presentation logic includes instructions for controlling display of symbols on the reels or reel display.

Because the machine includes reels or a reel display, the game play frequently involves playing a slot game. However, the invention is not limited in this manner. Other types of game play include playing a video card game, baccarat, video pachinko, a lottery, keno, and/or a bingo game.

The one or more reels or the reel display may be mechanically rotatable reels. Alternatively, the reels or the reel display may be a curved surface of a digital or video display device. In certain embodiments, the reels or the reel display include an organic light emitting diode (OLED) device for displaying the symbols. For example, the reels or the reel display may comprise an OLED device on a mechanical reel. In certain embodiments, the reels or the reel display include an electroluminescent display for displaying the symbols. In some gaming machines of this invention, the apparatus includes a projection-type display device configured to cast an image of reel symbols onto the reels or the reel display.

In certain embodiments, a video reel display and the video display device are configured to cooperate in displaying three-dimensional visual output that has an actual three-dimensional depth along the common line of sight. In certain embodiments, the one or more reels or the reel display comprises a multilayer display. In some cases, the video display device comprises a non-transparent liquid crystal display.

Another feature that may be included in apparatus is a touch screen proximately located along the common line of sight and positioned to allow a player to select game options by touching regions on the video display device along the common line of sight.

In various embodiments, the mechanism for moving includes a motor drive for moving the video display device into and out of the common line of sight. In addition or alternatively, the mechanism for moving includes a motor drive for moving the reels or reel display into and out of the common line of sight.

Certain aspects of the invention pertain to systems having one or more gaming machines as described above incorporated on a network.

Another aspect of the invention pertains to methods of presenting a game on a gaming machine. Such methods may be characterized by the following operations: (a) determining that an aspect of a game is to be displayed on either (i) one or more reels or a reel display mounted to or within a cabinet of gaming machine or (ii) a video display device positioned in front of and along a common line of sight with respect to the reels or reel display; (b) moving at least one of the video display device and the reels or reel display into and out of position along the common line of sight depending upon which one is to determined to display the aspect of the game; and (c) executing instructions that permit game play on the gaming machine. In certain embodiments, the gaming machine employed in such methods contains one or more of the features described above. For example, the gaming machine may include game presentation logic and a processor to present video information on the video display device pertinent to said game play on the gaming machine. In addition, the gaming machine may include a mechanism for moving at least one of the video display device and the reels or reel display into and out of position along the common line of sight.

In certain embodiments, determining that an aspect of a game is to be displayed involves determining which of two different types of game is to be displayed. Based on this, the gaming machine determines whether to move (i) the at least one video display device or (ii) the reels or reel display. For example, the reels or reel display may be moved into position along the common line of sight when a slot game type is selected.

These and other features and advantages of the invention will be described in more detail below with reference to associated drawings.

DETAILED DESCRIPTION

Figure 1A:
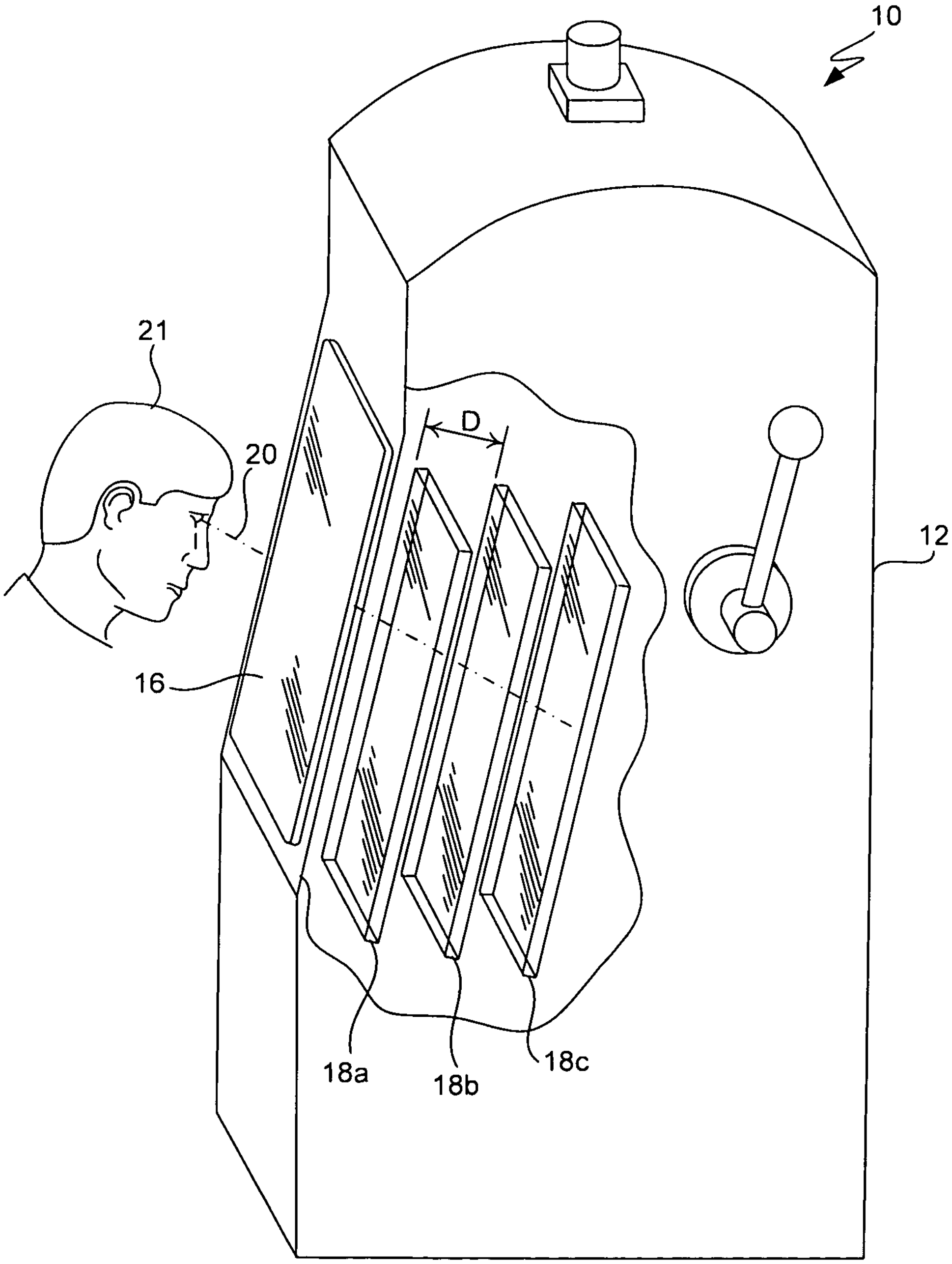
FIG. 1A is a perspective view of a gaming machine in accordance with one embodiment of the present invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The present invention includes a gaming machine with multiple display devices arranged in a common line of sight relative to a person near the gaming machine. Multiple display devices disposed along a common line of sight are also referred to herein as 'layered' displays. One or more of the layered display devices proximate to the person are completely or partially transparent or translucent so as to permit view of the distal display devices.

The distal display may include a curved display device, such as a curved OLED or a projection system that casts an image onto a curved surface. These curved display devices are suitable for mimicking a conventional mechanical reel game, but allow the digital and external control of reel games on the curved digital display. Glass LCDs may be curved and are also suitable for use.

This multi-layer display device arrangement improves visual output for a gaming machine. As will be described below, display device arrangements described herein permit better graphics for a game played on a gaming machine, more games to be played on a single gaming machine, and/or dynamic reconfiguration of a gaming machine to offer multiple games that traditionally required manual and mechanical reconfiguration of a gaming machine, e.g., to change the number of reels for new reel game that requires five reels instead of three.

In one embodiment, all three display devices are digital and permit reconfiguration in real time. This permits new or different games to be downloaded onto a gaming machine, and reconfiguration of the three display devices to present a new or different game using any combination of the three display devices. For a casino, or other gaming establishment, this permits a single gaming machine to offer multiple games without the need for gaming machine maintenance or replacement when a new game is desired by casino management or customer demand.

Controlling transparency of the outer one or two display devices also provides novel game presentation versatility on a single gaming machine. In one embodiment, the intermediate display device acts as a light valve that controls whether the interior display device is visible, or what portions of the interior display device are visible. For example, window portions of the intermediate light valve may be left transparent to permit viewing of a select number video reels disposed on a curved OLED display device arranged behind the light valve. Since the number (and size) of video reels on the curved OLED display device may be digitally changed, e.g., from 3 video reels to 5 to 7 etc., controlling opacity of the intermediate light valve permits the gaming machine to visually offer multiple reel games with a different number of reels on a single gaming machine—without maintenance resources and casino downtime to change mechanical reels.

In another embodiment, the intermediate light valve completely blocks out the interior display device, where the outermost display device is now solely visible and used for game presentation. The gaming machine now resembles a conventional gaming machine that only includes a single and outer LCD panel. The gaming machine may then respond to digital controls to switch between a reel game, a multi-layer/multi-display game, and a simple one-panel LCD game. Other uses of the layered displays are possible and contemplated.

Player participation on a gaming machine increases with entertainment. Improved visual output provided by the present invention enables more entertaining forms of interaction between a player and gaming machine, and thus improves player participation and patronage for a casino or gaming establishment that includes a gaming machine of the present invention.

For example, the common line of sight and layered displays improve presentation of three-dimensional (3D) graphics. A gaming machine may use a combination of virtual 3D graphics on any one of the display devices—in addition to 3D graphics obtained using the different depths of the layered display devices. Virtual 3D graphics on a single screen typically involve shading, highlighting and perspective techniques that selectively position graphics in an image to create the perception of depth. These virtual 3D image techniques cause the human eye to perceive depth in an image even though there is no real depth (the images are physically displayed on a single display screen, which is relatively thin). Also, a predetermined distance (between display screens for the layered display devices) facilitates the creation of graphics having real depth between the layered display devices. 3D presentation of graphic components may then use a combination of: a) virtual 3D graphics techniques on one or more of the multiple screens and/or b) the depths between the layered display devices. Further description of 3D graphics presentation is provided below.

Although the following examples describe display systems that include layered display devices for a primary display located centrally in a gaming machine, those of skill in the art will recognize that display systems described herein are applicable towards other areas of a gaming machine, such as a top glass or a belly glass.

As the term is used herein, a display device refers to any device configured to adaptively output a visual image to a person in response to a control signal. In one embodiment, the display device includes a screen of a finite thickness, also referred to herein as a display screen. For example, LCD display devices often include a flat panel that includes a series of layers, one of which includes a layer of pixilated light transmission elements for selectively filtering red, green and blue data from a white light source. Numerous exemplary display devices are described below.

The display device is adapted to receive signals from a processor or controller included in the gaming machine and to generate and display graphics and images to a person near the gaming machine. The format of the signal will depend on the device. In one embodiment, all the display devices in a layered arrangement respond to digital signals. For example, the red, green and blue pixilated light transmission elements for an LCD device typically respond to digital control signals to generate colored light, as desired.

In one embodiment, the gaming machine includes two display devices, including a first, foremost or exterior display device and a second, underlying or interior display device. For example, the exterior display device may include a transparent LCD panel while the interior display device includes a digital display device with a curved surface.

In another embodiment, the gaming machine includes three display devices, including a first, foremost or exterior display device, a second or intermediate display device, and a third, underlying or interior display device. The display devices are mounted, oriented and aligned within the gaming machine such that at least one—and potentially numerous—common lines of sight intersect portions of a display surface or screen for each display device. Several exemplary display device systems and arrangements that each include multiple display devices along a common line of sight will now be discussed.

Layered display devices may be described according to their position along a common line of sight relative to a viewer. As the terms are used herein, ‘proximate’ refers to a display device that is closer to a person, along a common line of sight (such as 20 in FIG. 1A), than another display device. Conversely, ‘distal’ refers to a display device that is farther from a person, along the common line of sight, than another.

Figure 7:
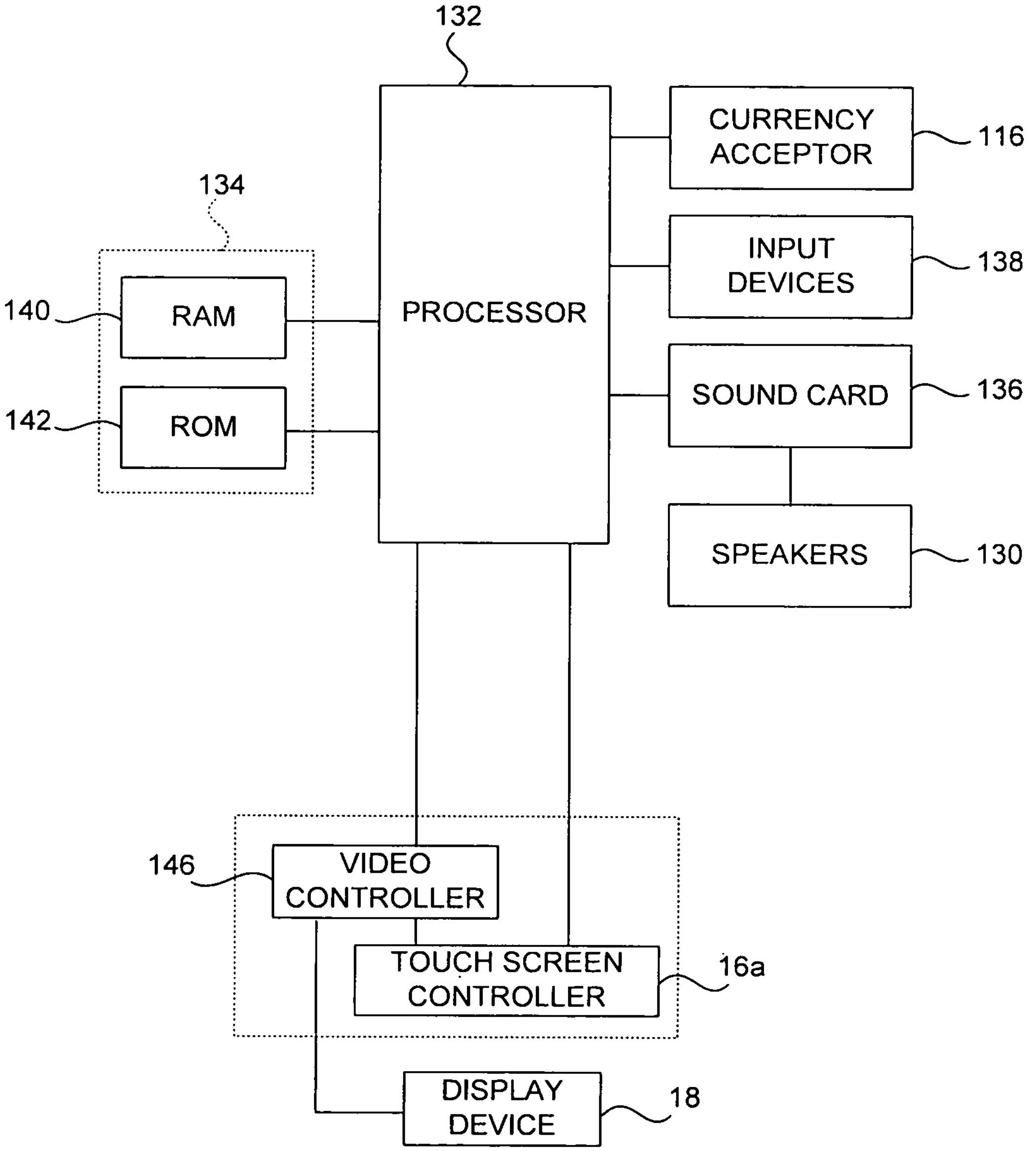
FIG. 7 illustrates a control configuration for use in a gaming machine in accordance with another specific embodiment of the present invention.

Referring now to FIGS. 1A and 7, a gaming machine 10 of one embodiment of the present invention includes a cabinet or housing 12 that houses exterior display device 18*a*, intermediate display device 18*b*, interior display device 18*c*, touchscreen 16, and a processor 132 (FIG. 7) that communicates with a memory device 134 and with each of the display devices 18 and touchscreen 16. The processor 132 controls the operation of components in gaming machine 10 to present one or more games, receive player inputs using the touchscreen 16, and control other gaming interactions between the gaming machine and a person 21.

Under the control of processor 132, display devices 18 generate visual information for person 21. As shown in FIG. 1A, there are three layered display devices 18: a first, exterior or frontmost display device 18*a*, a second or intermediate display device 18*b*, and a third, interior, or backmost display screen 18*c*. The display devices 18*a*, 18*b* and 18*c* are mounted and oriented within the cabinet 12 in such a manner that a straight and common line of sight 20 intersects the display screens of all three display devices 18*a*, 18*b* and 18*c*. In addition, display devices 18*a*, 18*b* and 18*c* are all relatively flat and aligned about in parallel to provide a plurality of common lines of sight that intersect screens for all three.

The gaming machine may also include one or more light sources. In one embodiment, display devices 18 include LCD panels and at least one light source that provides light, such as white light, to the pixilated filter elements on each LCD panel. For example, a back lighting source (not shown) may be positioned behind display device 18*c*. The pixilated panel for each parallel display device 18*a*, 18*b* and 18*c* then filters white light from the backmost backlight to controllably output color images on each screen.

Other light sources may be used to illuminate a reflective or transmissive light filter. For example, each display device 18 may be individually illuminated using a white light source attached near the sides of each pixelating panel; the side light source may include a mini-fluorescence source and light guide that transmits light from the side light source, down the flat panel, and to all the pixilated filter elements in the planar LCD panel for pixilated image production. Other suitable light sources may include cold cathode fluorescent light sources (CCFLs) and/or light emitting diodes, for example.

In another embodiment, a distal and emissive display device is arranged behind a proximate and non-emissive display device, and provides light to the proximate display device, which then filters the light to create an image. For example, a flat OLED or plasma display device 18*c* may be used to a) produce an image and b) to emit light that is filtered by LCD panels 18*a* and 18*b*. In this case, the distal and emissive display device emits at least some white light. For example, video output of one or more reels may include significant white light that is also used to illuminate one or more LCD panels for pixilated filtering. In another embodiment, the proximate LCD panels use reflective light where the light comes from in front of the gaming machine, e.g., from the ambient room. As one of skill in the art will appreciate, more light is needed as the number of reflective or non-emissive light filter-type display device increases, e.g., from 1 to 2 pixelated LCD panels 18*a* and 18*b*.

The proximate display devices 18*a* and 18*b* each have the capacity to be partially or completely transparent or translucent. In a specific embodiment, the relatively flat and thin display devices 18*a* and 18*b* are liquid crystal display devices (LCDs). Other display technologies are also suitable for use. Various companies have developed relatively flat display devices that have the capacity to be transparent or translucent. One such company is Uni-Pixel Displays, Inc., Inc. of Houston Tex., which sells display screens that employ time multiplex optical shutter (TMOS) technology. This TMOS display technology includes: (a) selectively controlled pixels that shutter light out of a light guidance substrate by violating the light guidance conditions of the substrate and (b) a system for repeatedly causing such violation in a time multiplex fashion. The display screens that embody TMOS technology are inherently transparent and they can be switched to display colors in any pixel area. A transparent OLED may also be used. An electroluminescent display is also suitable for use with proximate display devices 18*a* and 18*b*. Also, Planar Systems Inc. of Beaverton Oreg. and Samsung of Korea, both produce several display devices that are suitable for use herein and that can be translucent or transparent. Kent Displays Inc. of Kent Ohio also produces Cholesteric LCD display devices that operate as a light valve and/or a monochrome LCD panel.

Figure 1B:
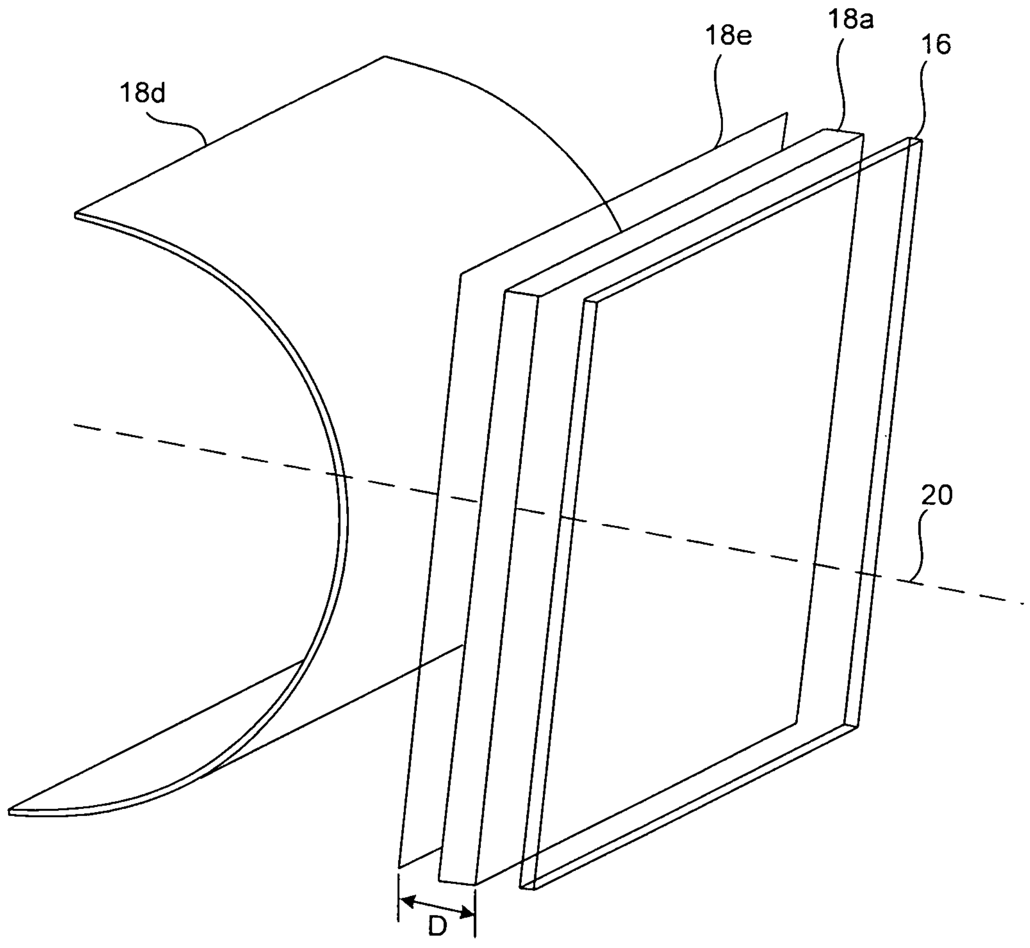
FIG. 1B shows a display device arrangement suitable for use with a gaming machine in accordance with another embodiment of the present invention.

FIG. 1B shows a display device arrangement suitable for use with a gaming machine in accordance with another embodiment of the present invention. In this arrangement, a touchscreen 16 is arranged in front of an exterior LCD panel 18*a*, an intermediate light valve 18*e* and a display device 18*d* with a curved surface. A common line of sight 20 passes through all four layered devices.

Light valve 18*e* selectively permits light to pass therethrough in response to a control signal. Various devices may be utilized for the light valve 18*e*, including, but not limited to, suspended particle devices (SPD), Cholesteric LCD devices, electrochromic devices, polymer dispersed liquid crystal (PDLC) devices, etc. Light valve 18*e* switches between being transparent, and being opaque (or translucent), depending on a received control signal. For example, SPDs and PDLC devices become transparent when applied with a current and become opaque or translucent when little or no current is applied. On the other hand, electrochromic devices become opaque when applied with a current, and transparent when little or no current is applied. Additionally, light valve 18*e* may attain varying levels of translucency and opaqueness. For example, while a PDLC device is generally either transparent or opaque, suspended particle devices and electrochromic devices allow for varying degrees of transparency, opaqueness or translucency, depending on the applied current level. Further description of a light valve suitable for use herein is described in commonly owned and co-pending patent application Ser. No. 10/755,657 and entitled "METHOD AND APPARATUS FOR USING A LIGHT VALVE TO REDUCE THE VISIBILITY OF AN OBJECT WITHIN A GAMING APPARATUS", which is incorporated herein by reference in its entirety for all purposes.

In one embodiment, the gaming machine includes a touchscreen 16 disposed outside the exterior display device 18*a*. Touchscreen 16 detects and senses pressure, and in some cases varying degrees of pressure, applied by a person to the touchscreen 16. Touchscreen 16 may include a capacitive, resistive, acoustic or other pressure sensitive technology. Electrical communication between touchscreen 16 and the gaming machine processor enable the processor to detect a player pressing on an area of the display screen (and, for some touchscreens, how hard a player is pushing on a particular area of the display screen). Using one or more programs stored within memory of the gaming machine, the processor enables a player to activate game elements or functions by applying pressure to certain portions of touchscreen 16. Several vendors known to those of skill in the art produce a touchscreen suitable for use with a gaming machine.

As the term is used herein, a common line of sight refers to a straight line that intersects a portion of each display device. The line of sight is a geometric construct used herein for describing a spatial arrangement of display devices and need not be an actual line of some sort in the gaming machine. If all the proximate display devices are transparent along the line of sight, then a person should be able see all the display devices along the line of sight. Multiple lines of sight may also be present in many instances. As illustrated in FIG. 1B, one suitable arrangement includes screens for two display devices 18*a* and 18*d* that are intersectable by a common line of sight 20.

Rear display device 18*d* includes a digital display device with a curved surface that shows video data. A digital display device refers to a display device that is configured to receive and respond to a digital communication, e.g., from a processor or video card. Thus, OLED, LCD and projection type (LCD or DMD) devices are all examples of suitable digital display devices. E Ink Corporation of Cambridge Mass. produces electronic ink displays that are suitable for use in rear display device 18*d*. Microscale container display devices, such as those produced SiPix of Fremont Calif., are also suitable for use in rear display device 18*d*. Several other suitable digital display devices are provided below.

One suitable curved digital display device includes a projector that casts an image onto a curved surface. Suitable projectors include LCD-type and DMD-type projectors, as available from a wide variety of vendors known to those of skill in the art. In this case, the curved surface includes a white screen or translucent material, such as plastic, curved to desired dimensions. In a specific embodiment, the curvature substantially resembles the curvature of traditional mechanical reels used in a slot machine. Another suitable curved digital display device includes a flexible organic light emitting diode (OLED). Many flexible OLEDs are conformable and may be bent over a shape to take the shape of an mechanical support such as an underlying structure or frame. Some flexible OLEDs are thin and resemble paper; these flexible OLEDs are usually flexible but not foldable. A third form of flexible OLED is rollable and has a shape memory. Any of the theses flexible OLEDs types are suitable for use herein. Typically, the flexible OLED is bent over and attached to a curved sub-structure or stationary framework that provides structural support and maintains a desired curvature. Other digital display devices with curved surfaces are suitable for use and include a front projection display, or a rear projection display, LCD glass, transparent OLED, and fOLED.

In a specific embodiment, a flexible OLED changes shape over time. For example, one or more actuators may move points of the flexible OLED to mechanically deform the display and achieve a desired shape. This may be done to change a curved and flexible OLED to a convex shape, serpentine shapes, a curvature similar to a reel, a flat curvature, etc. These shape changes may occur in real time.

In one embodiment, all the layered displays are configured (spatially and using video provided to each display device) to resemble a traditional mechanical slot machine. In this case, curvature of the curved surface for interior display device 18*d* substantially resembles the curvature of a traditional mechanical reel. While traditional mechanical reels come in a variety of diameters and widths that the curved surface of display device 18*d* may mimic in diameter, width, and/or curvature, traditional mechanical reels were typically circular and the curvature was relatively constant. To resemble a traditional mechanical slot machine then, the curved surface of interior display device 18*d* may then include a circular surface of a suitable diameter.

In a specific embodiment, the interior display device 18*d* includes a flexible OLED that is bent to resemble mechanical slot reels. The curved surface is then produced by the final shape of the bent and flexible OLED, which may be fixed to a cylinder or support of a desired diameter to preserve the curved shape. The curved OLED then outputs 'virtual slot reels', or video information resembling slot reels.

The curved digital display device permits remote and digital reconfiguration of video output by display device 18*d*. For example, display device 18*d* and its curved surface is well suited to display video reel games that mimic mechanical reels that were used in older slot machines (and are still popular in the gaming industry). The digital nature of display device 18*d*, however, permits the reel game to be changed as games are downloaded to the gaming machine. For example, the symbols on the reels may be changed to present a new reel game. Thus, new symbols or a different number of symbols may be used in the new game. Alternatively, the number of reels may be changed. Display device 18*d* may output color video or black and white video, depending on the game or display device technology used.

Referring to either arrangement of FIG. 1A or 1B, the portions of proximate display devices 18*a* and 18*b* along line of sight 20 are significantly transparent or translucent. Pixilated element panels on many non-emissive displays such as LCD panels are largely invisible to a viewer. More specifically, many display technologies, such as electroluminescent displays and LCD panels, include portions that are transparent when no video images are displayed thereon. For example, an electroluminescent display may utilize non-organic phosphors that are both transparent and emissive (such as a tOLED), and addressed through transparent row and column drivers. Pixilated element panels on LCD panels are also available in significantly transparent or translucent designs that permit a person to see through the pixilated panels when not locally displaying an image.

Portions of touchscreen 16 and light valve 18*e* are also translucent or transparent, or alternatively have the capacity to be translucent or transparent in response to control signals from a processor included in the gaming machine. When portions (or all) of the screens for touchscreen 16, display devices 18*a* and 18*b*, and light valve 18*e* are transparent or translucent, a player can simultaneously see images displayed on the display screen 18*a* and 18*b*—as well as the images displayed on the interior display devices 18*c* or 18*d*—by looking through the transparent portions of proximate display devices.

Accordingly, the present invention can display co-acting or overlapping images to a person (see FIGS. 2-5). For example, front display devices 18*a* or 18*b* may display paylines that illuminate winning combinations reels disposed on display devices 18*c* or 18*d*. In addition, the layered display devices may also provide 3D images that include a combination of virtual 3D graphics on images on each screen and 3D output between the layered display devices.

In one embodiment, exterior display device 18*a* includes central portions that are transparent to permit viewing of the virtual slot reels that are shown on the curved surface of display device 18*d*, while peripheral portions of the exterior display device 18*a* show a pay table or other game relevant information, such as whether a bonus game or progressive game is available. Intermediate display device 18*e* may include a light valve or light pipe with transparent windows that permit viewing of the virtual slot reels on the curved OLED. Alternatively, the intermediate display device may include a transparent LCD 18*b* that has a) transparent windows to permit viewing of the virtual slot wheels and b) other information such as a bonus game. In any of these configurations, a person can simultaneously view graphical representation of all the images: the interior virtual reels, the intermediate bonus game, and the external pay table.

The present invention also permits a casino or gaming establishment to change video on each of the layered display devices, and their transparency, without physically altering the gaming machine or requiring maintenance. Thus, the number of virtual slot reels on the curved OLED may be changed from 3 to 5 to 9 or some other number, while the intermediate and exterior display devices change the position of their transparent windows for viewing of the different number of virtual slot reels. Also, a pay table shown on display device 18*a* may be changed at will, in addition to changing weather a bonus or progressive game is shown on the intermediate display device.

Figure 1C:
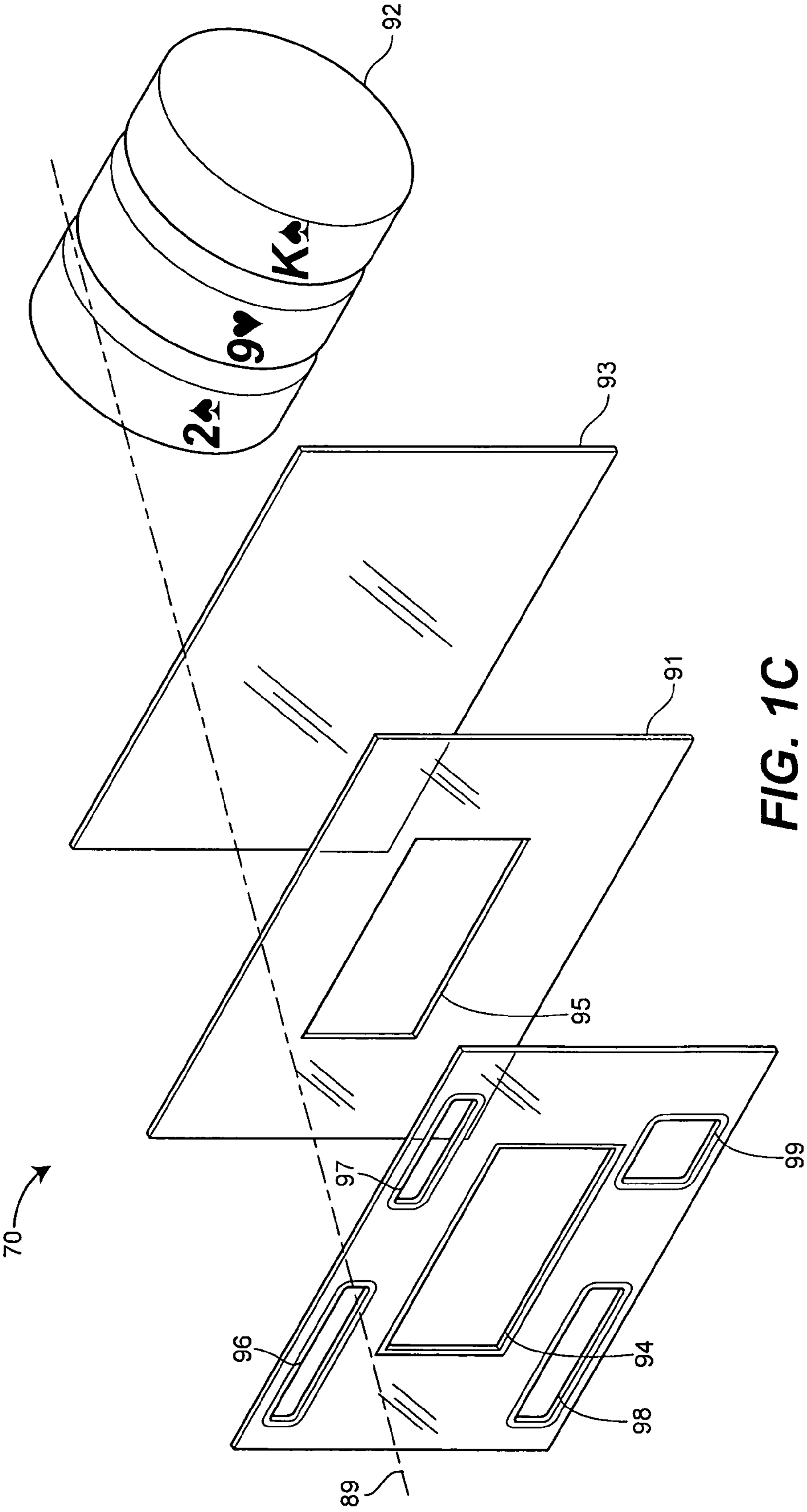
FIG. 1C is an exploded perspective view of a display device arrangement in accordance with another embodiment of the present invention.

FIG. 1C is an exploded perspective view of a display device arrangement 70 in accordance with another embodiment of the present invention. Arrangement 70 includes a front video display device 90, rear curved display device 92, light valve 93 and backlight 91 arranged along a common line of sight 89.

Front video display device 90 includes a flat display screen incorporating flat-panel display technology. This may include a liquid crystal display (LCD), a transparent light emitting diode (LED) display, an electroluminescent display (ELD), and a microelectromechanical device (MEM) display, such as a digital micromirror device (DMD) display or a grating light valve (GLV) display, etc. A display screen of the front video display device 90 may further include organic display technologies such as an organic electroluminescent (OEL) display and an organic light emitting diode (OLED)

display, as well as a light emitting polymer display. In addition, the front video display device 90 may include a touch-sensitive display that facilitates user input and interaction between a person and gaming machine.

In many of above examples, display device 90 incorporates emissive display technology. That is, the display screen, such as an electroluminescent display, is capable of emitting light and is self-illuminating. However, some display device technologies, such as an LCD, are not emissive. In other words, a non-emissive display generally does not emit light or emits only low amounts of light, and is not self-illuminating. In the case of non-emissive displays for the front video display device 90, display system 70 may include a backlight 91 to provide luminescence to video images displayed on the front video display device 90. As mentioned above, many display devices suitable for use as front video display device 90 are significantly transparent when portions of the display include no images are provided on those portions.

Rear display device 92 includes a digital display device with a curved surface. In this case, rear display unit 92 includes a curved OLED device on a stationary cylindrical support. As shown, rear display device 92 includes video output that resembles multiple mechanical reels. The video output may be presented such that the video reels appear rotatable and that each includes a plurality of reel images disposed on each reel. Each video reel may also include illumination that resembles a light element used in traditional mechanical reels to illuminate the reel images or other portions of the mechanical reel.

A light valve 93 is disposed between front video display device 90 and rear display device 92, and may include a light valve as described above with respect to light valve 18*e*.

In operation, when the light valve 93 is opaque, or substantially opaque, a player's view of the rear display device 92 is obscured or obstructed. The light valve 93 may also be translucent and provide varying degrees of visibility of the rear display device 92 through the opening, thereby varying the visibility of the rear display device 92 (e.g., gradually "dimming" or "brightening" the visibility of the rear display device 92). Varying the translucency of light valve 93 causes visibility of rear display device 92 to range from allowing the player to view and recognize images on rear display device 92 to merely allowing light and color through without being able to distinguish the images.

Front video display device 90 may include one or more openings that allow a player to view the rear display device 92 when the light valve 93 is transparent or substantially transparent. In this case, front video display device 90 includes a single opening 94 that is aligned with the location of video reels output on rear display device 92. Likewise, if provided with a backlight 91, the backlight 91 includes one or more openings 95 that coincide with opening 94 of the front video display unit 90. The openings 94, 95 allow a player to see at least a portion of the rear display unit 92 when the light valve 93 is transparent. Rear display unit 92 may also be visible when the light valve 93 is translucent, though this may depend on the degree to which the light valve 93 is translucent. Front video display unit 90 may include additional openings 96, 97, 98 and 99 to view additional information displayed on rear display unit 92. For example, one or more of the reel images may be viewable by a player through central openings 94 and 95, whereas additional display units, such as static displays or video displays, may be included as part of the rear display unit 92 and visible to the player through the openings 96, 97, 98 and 99. Corresponding openings (not shown) may be provided in the backlight 91 to match openings 96, 97, 98 and 99.

Openings 94, 96, 97, 98 and 99 in front video display device 90 may be provided as physical openings in the front video display device 90. Physical openings may be formed by forming openings in the display screen material and connecting the resulting edges to appropriate video control lines for row and column addressing to display video images on the remaining display screen. Physical openings may also be formed by using multiple smaller, interconnected display screens for front video display device 90, which are arranged to leave spacing between the display screens to form the openings. Alternatively, the openings 94, 96, 97, 98 and 99 may be provided as virtual openings. For example, if front video display device 90 includes a transparent display screen, such as an electroluminescent display, front video display device 90 may appear transparent when a video image is not displayed. By selectively preventing images from being displayed on certain portions of front video display device 90 using row and column addressing, virtual openings may be formed that allow a player to see through the front video display unit 90. If front video display device 90 includes an LCD, or other non-emissive display, with a backlight 91, physical openings may also be formed in the backlight 91 causing any image on the LCD in front of the openings 95 to be virtually invisible to the player without lighting from the rear.

If light valve 93 is transparent, a person may see through the virtual openings of display device 90 to view an image on rear display device 92. Video images may also be displayed on portions of front video display device 90 that do not correspond to openings 94, 96, 97, 98 or 99, whether physical or virtual. However, if openings 94, 96, 97, 98 and 99 are provided as virtual openings, video images may be displayed on the portions of front video display device 90 corresponding to the virtual openings. The video images may be displayed on the virtual openings when light valve 93 is opaque (or translucent). Video images may also be displayed on the virtual openings when the light valve is transparent, thereby superimposing the video images on an image displayed on the rear display unit 92.

Display screens for any of the display devices described above may have any suitable shape, such as flat, relatively flat, concave, convex, and non-uniform shapes. In one embodiment, the display devices are all relatively flat display screens. LCD panels for example typically include a relatively flat display screen. OLED display devices may also include a relatively flat display surface. Alternatively, an OLED display device may include a non-uniform and custom shape such as a curved surface, e.g., a convex or concave surface. Such a curved convex surface is particularly well suited to provide video information that resembles a mechanical reel. The OLED display device differs from a traditional mechanical reel in that the OLED display device permits the number of reels or symbols on each reel to be digitally changed and reconfigured, as desired, without mechanically disassembling a gaming machine.

Relative arrangement of the display devices may vary with shape of the respective display screens. In a specific embodiment, the multiple display devices include more than one relatively flat screen surface and the flat screens are positioned in planes that are about parallel to one another. For instance, two layered display devices may include LCD panels arranged in parallel with a light source disposed behind the interior LCD panel (for backlighting) or at the sides of each LCD panel. Alternatively, the external display device may include a transparent LCD panel while the back most display device includes a cathode ray tube (CRT) or other light source such as a plasma screen, where the screens for each device are approximately arranged in parallel. The display screens may be positioned in planes that are not parallel to one another, provided that at least one (and possibly multiple) line of sight commonly intersects portions of display surfaces for each display devices. For example, screens for display devices 18*a* and 18*b* of FIG. 1A are positioned in about parallel planes.

In one embodiment, a predetermined distance "D" separates the display screens for the multiple display devices. As shown in FIGS. 1A and 1B, a predetermined distance, D, separates screens for the proximate display devices and represents the distance from the display surface of display device 18*a* to display surface of display device 18*b* (FIG. 1A) or display device 18*e* (FIG. 1B). This distance can be any distance as desired by a gaming machine manufacturer. It should be appreciated that in one embodiment, the display screens can be positioned adjacent to each other such that only the thickness of the display screens separates the display surfaces. In this case, the distance D depends on the thickness of the exterior display screen.

The multiple display devices may each generate their own graphics and images, or cooperate to provide coordinated visual output. For example, a game that includes a wooded environment with trees may include trees on the first and foremost display device 18*a*, trees on the intermediate display device 18*b*, and trees on the interior display device 18*c* of FIG. 1A. Objects and graphics in this game may then appear on any three of the display devices, where the opaque trees on the proximate screen(s) block the view objects on the distal screen(s), depending on the position of the viewer relative to the screens. This provides actual perspective between the graphics objects, which represents a real-life component of 3D visualization (and not just perspective virtually created on a single screen).

Although the present invention has shown three exemplary display device arrangements so far, other arrangements are suitable for use. One embodiment includes an exterior transparent LCD panel, an intermediate LCD panel or light valve, and an internal OLED device. Another embodiment includes an exterior touchscreen over an exterior transparent LCD panel, an intermediate LCD panel, and an internal curved OLED device. In general, the present invention may include any combination of the digital display devices mentioned above and arranged in a common line of sight.

A gaming machine uses the layered display devices to show visual information on the different screens that a player can simultaneously see. Various game presentations and uses of the layered display devices will now be discussed.

In a specific example, the gaming machine generates a game image on an interior display device and a flashing translucent image on a proximate display device. The game could for example, be reels or one or more wheels, and a flashing image on the proximate display could be a translucent line that indicates the payline(s) on the reels. Since some games permit multiple paylines based on the person's wager, this permits the game to show multiple paylines responsive to the person's actions. Alternatively, the proximate display may show a symbol or message that provides a player with helpful information such as a hint for playing the game. Notably, each of these examples allows the person to play the game while viewing the flashing image without having to change his or her line of sight or having to independently find such information from another portion of the gaming machine.

Figure 2A:
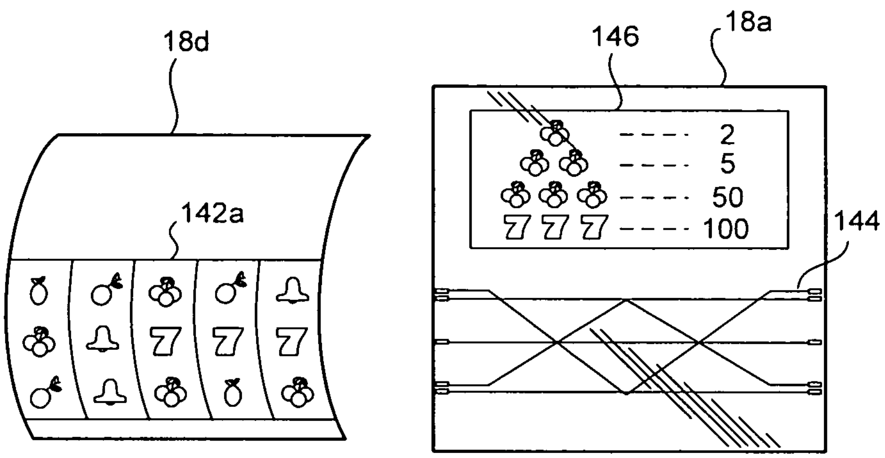
FIGS. 2A and 2B illustrates one game example where curved display device outputs a video reel image in accordance with a specific embodiment of the present invention.
Figure 2B:
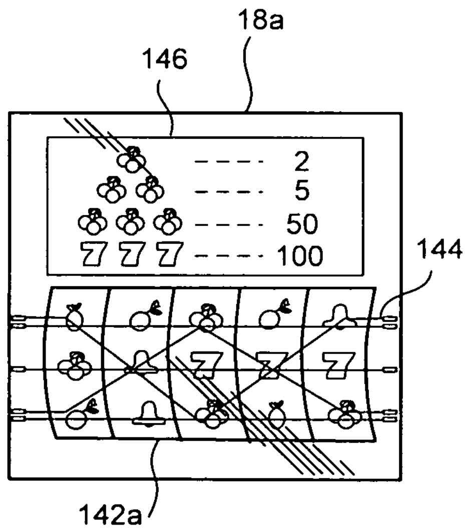

FIGS. 2A and 2B illustrates one game example where curved display device 18*d* outputs a video reel image 142*a* in accordance with a specific embodiment of the present invention. The exterior display device 18*a* displays a paytable image 146 and paylines 144. When the exterior display device 18*a* and the interior display device 18*d* present their images simultaneously, the player views the overall graphical representation or display, through the frontmost display device 18*a*, as illustrated in FIG. 2B. In this example, the paylines are actually in front of the reels and the paytable is above the reels.

In another example, exterior display device 18*a* displays an advertisement image in place of the paytable image 146. The advertisement image may include the casino that controls the gaming machine, a business such as a restaurant that has paid the casino for the advertising space, etc. This enables a player to simultaneously view the reel image 142*b*, the payline image 144 and the advertising without having to change his or her line of sight.

Figure 3:
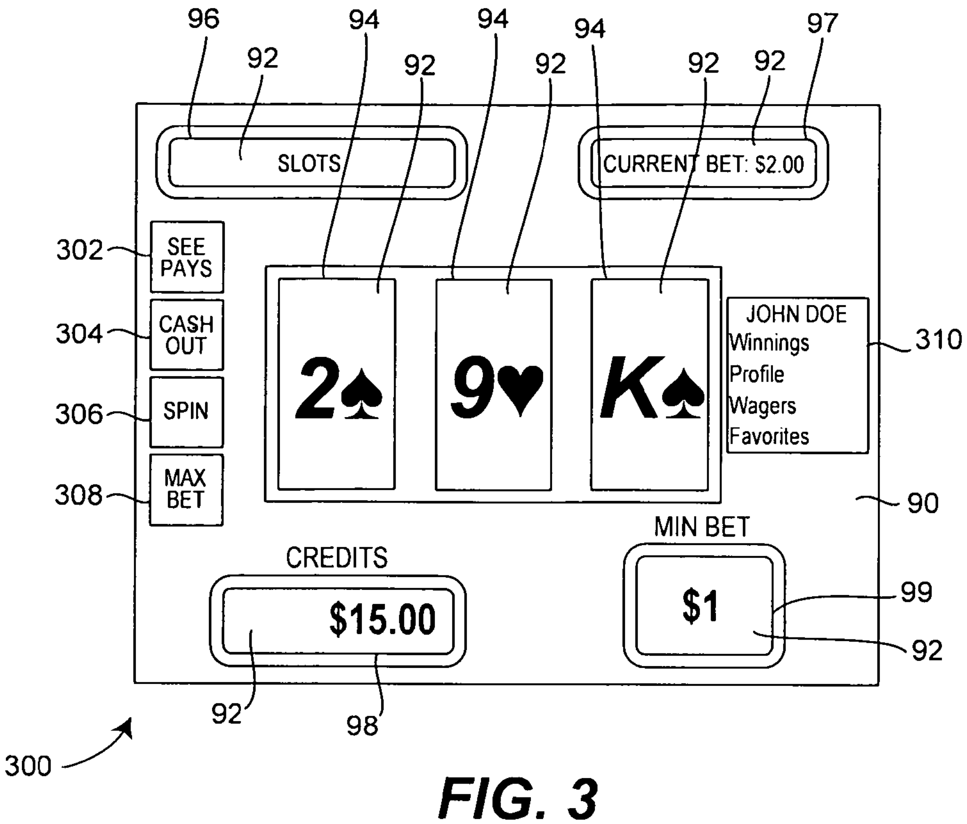
FIG. 3 shows exemplary video output that may be shown on the display system of FIG. 1C during performance of a slots routine using reels display on the curved display device in accordance with another specific embodiment of the present invention.

FIG. 3 is an exemplary display 300 that may be shown on the display system 70 of FIG. 1C during performance of a slots routine using reels display on the curved display device 92, in accordance with another specific embodiment of the present invention. Referring to FIG. 3, light valve 93 has been deactivated to allow images on rear display device 92 to be visible. A player is able to view portions of the video reels through the openings 94 in the front video display device 90. Additional graphics may also be displayed by the rear display device 92 and viewed through the various openings in the front video display unit 90. For example, a name of the game routine being played may be viewed through opening 96, a current bet may be viewed through opening 97, a number of remaining credits may be viewed in opening 98, and a minimum bet may be displayed in opening 99. Additional graphics relating to the game routine may be displayed on the front video display device 90. For example, the front video display device 90 may include video images of a plurality of player selectable buttons to allow the player to control the play of the slots game. The buttons may include a "See Pays" button 302, a "Cash Out" button 304, a "Spin" button 306, and a "Max Bet" button 308. Player information may also be generated as a video image 310 on the front video display device 90. The player information video image 310 may include the player's name, the player's winnings, the player's profile, the player's wagers, the player's favorite games, etc. If provided as virtual openings, additional graphics (not shown) may be generated on the portions of the front video display device 90 corresponding to one or more of the openings 94, 96, 97, 98, 99 and superimposed over images on the rear display device 92 that are viewed through the openings 94, 96, 97, 98, 99.

Figure 4:
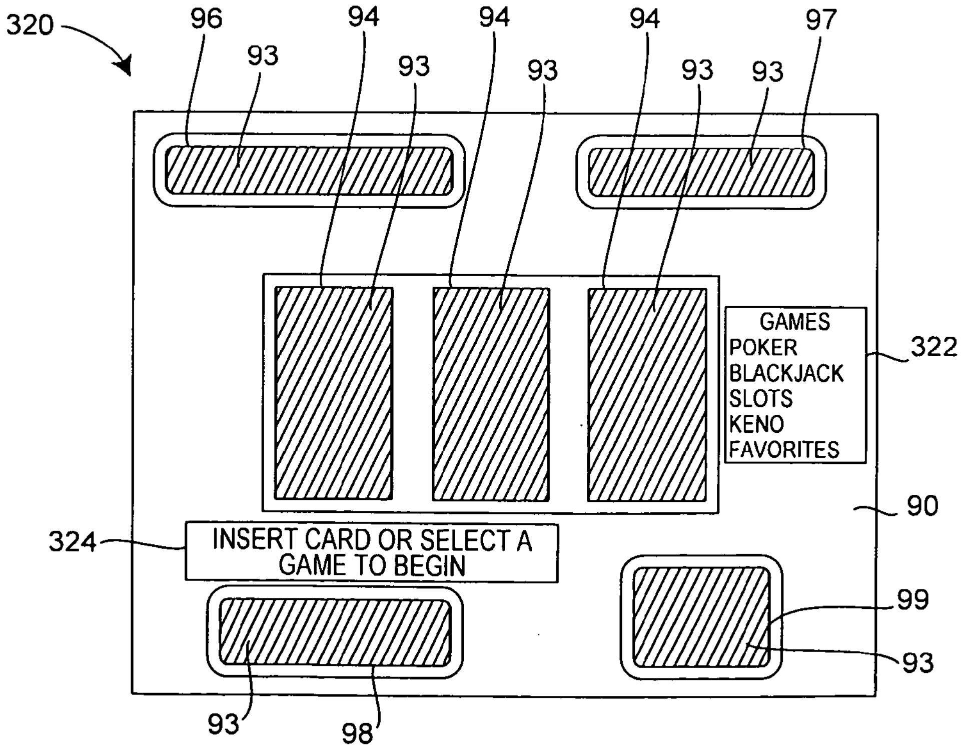
FIG. 4 shows exemplary video output shown on the display system of FIG. 1C when the light valve has been activated to obscure the images on rear display device.

FIG. 4 shows exemplary video output 320 shown on display system 70 of FIG. 1C when light valve 93 has been activated to obscure the images on rear display device 92. As seen in FIG. 4, a player viewing the video display system 70 is unable to see the rear display device 92 through the various openings 94, 96, 97, 98, 99 in the front video display unit 90.

The video output 320 as shown in FIG. 4 may relate to a display shown during an attraction sequence. Attraction graphics may be generated on the front video display device 90, which may include a video image 322 of a scrolling list of games that may be played on a gaming machine, and a video image 324 of instructions for initiating a new game. Although not shown, images or games other than spinning reels may be generated on the openings 94, 96, 97, 98, 99 if provided as virtual openings.

These examples illustrate the capability of a gaming machine of the present invention to enable a player to view different types of information and different types of images by looking at and through an exterior display screen. In some cases, the images displayed on the different display screens are positioned such that the images do not overlap (that is, the images are not superimposed). In other instances, the images overlap. It should also be appreciated that the images displayed on the display screen can fade-in fade out or pulsate to create additional affects.

In one embodiment, the gaming machine presents different game types on the layered display devices. For example, the interior and backmost display device may output a main game while a proximate display device shows a bonus game or progressive game. The bonus game or progressive game may result from playing the main game. Again, this permits the player to play the game while viewing a flashing bonus image without having to change his or her line of sight or having to independently find such information from another portion of the gaming machine.

Visual information on each of the distal screens remains visible as long as there are transparent or semi-transparent portions on the proximate screens that permit a user to see through these portions. Transparent portions may be selectively designed and timely activated according to game design, and changed according to game play. For example, if a game designer wants a person to focus on a bonus game on the front screen, they can use an intermediate light valve to black out the distal reel game on the interior curved OLED device.

In one embodiment, the gaming machine permits digital reconfiguration, which allows a single gaming machine to offer different games at different times. The games may be downloaded to the gaming machine via a network connection, or stored in memory for the gaming machine.

The present invention also permits display device reconfiguration. On one day, the gaming machine may offer games using all the layered display devices. The next day, the same gaming machine may offer a game that only uses an outer LCD panel and touchscreen, where a shutter (or other technology on front display) blocks out the back display devices. Some other subset of the layered displays may also be used. This permits dual-dynamic display device reconfiguration and/or game reconfiguration, at will, by downloading commands to the gaming machine that determine a) what game(s) is played, and b) what display device(s) is used. For example, this allows the same gaming machine to run a reel game one day and a video poker game another day that uses some subset of the display devices.

This reconfiguration of display devices used and games also enables new uses for gaming machines. Traditionally, a casino or other gaming establishment purchased a gaming machine and offered games only according to its display capabilities. If a casino purchased 250 gaming machines that only had LCD panels, and then later decided they wanted to implement reel games or other games that required more than an LCD panel, they were forced to purchase new gaming machines. The present invention, however, solves this problem for a casino. Accordingly, gaming machines as described herein permit a gaming establishment to a) switch games, at will, to any games offered by the multiple display devices, and b) switch display devices, again, at will.

One business advantage of this dual-dynamic display device reconfiguration and/or game reconfiguration is navigating gaming regulations imposed by different jurisdictions, which often change over time. First, each jurisdiction imposes its own set of rules on what games are locally permissible. Second, gaming regulators in each jurisdiction often change the local rules. This is particularly common for new gaming regulators and jurisdictions allowing casinos for the first time. The new gaming regulators may only permit class 2 games at first (e.g., video poker on an LCD panel) and later permit class 3 games (bingo and reel games, one year later). The present invention allows a new casino in this jurisdiction to adapt, instantly, to a regulations change with a) new games and b) new display device arrangements that were already on the gaming machine but not previously used. Thus, when some jurisdictions limit the number and types of games that can be played, the present invention allows a casino to switch games—on the fly without significant gaming machine maintenance or downtime in the casino—when jurisdiction rules change.

The present invention contemplates numerous combinations of video and co-acting images on the multiple display devices. For example, the present invention may include any combination of the options listed below for: a) an exterior display device, b) an intermediate display device and/or light filter, and c) the interior display device.

a) Video information output by the exterior display device may include: a primary, secondary or bonus game; a primary, secondary or tertiary part of a video game presented in conjunction with the other display devices; advertising information; a pay table; information regarding a primary, secondary or bonus game such as instructions, hints and directions; television, movie or other entertainment video; textual, graphic, or other information such as the name of the casino; etc. The exterior display device may also act as a filter to selectively block a person's view of any distal display devices, or portions thereof.

b) Video information output by the intermediate display device may include: a primary, secondary or bonus game; a primary, secondary or tertiary part of a video game presented in conjunction with the other display devices; advertising information; a pay table; information regarding a primary, secondary or bonus game such as instructions, hints and directions; television, movie or other entertainment video; textual, graphic, or other information such as the name of the casino; etc. The intermediate display device may also act as a filter to selectively block a person's view of the interior display device, or portions thereof.

c) Video information output by the distal display device may include: a primary, secondary or bonus game; a primary, secondary or tertiary part of a video game presented in conjunction with the other display devices; advertising information; a pay table; information regarding a primary, secondary or bonus game such as instructions, hints and directions; television, movie or other entertainment video; textual, graphic, or other information such as the name of the casino; etc.

An intermediate shutter may also be used for blackout purposes. In this case, the shutter turns black and blocks view of the interior display device when the gaming machine experiences some disturbance. For example, it is often desirable to blackout the interior display device during safety, power-outage and tilt situations, or during any other condition where game results may be questioned. Maintenance miscues may also lead to gaming machine disturbances, e.g., maintenance personnel left the door open. This provides a method for protecting the integrity of game results on the interior display device, such as a reel game, by ensuring that games are only viewable to a player when the gaming machine is operating correctly.

As mentioned above, the present invention improves 3D graphics presentation for a gaming machine. Layered display devices of the present invention permit both virtual 3D graphics (created within a single screen) and actual 3D graphics (created between screens). More specifically, each screen permits 3D graphics rendering on that screen to create virtual effects of perceived depth. Also, each display device provides a viewing surface or face—with a different depth along the common line of sight relative to a viewer—for displaying one or more 3D graphics (partial or hole) to the viewer.

Characterization of 3D graphics may vary. The 3D presentation may include actual three-dimensional space characterizations, such as x, y and z coordinates. In one embodiment, the z-dimension refers to the depth or distance that separates screens for the multiple display devices. In a specific embodiment, the z-dimension is measured along the common line of sight between multiple display devices. Images created on the multiple displays may thus have an actual and physical depth dimension. For 3D graphics rendering, this permits graphics with a width, height and (virtual and/or actual) depth. In a specific embodiment, width and height of graphics are measured along an x-axis and y-axis of screen surfaces for each of the display devices. Depth may then be measured along a z-axis that passes through a portion of each of the multiple screens along a common line of sight. In some cases, one or more of the screens are relatively flat, and this z-axis passes relatively perpendicular to each of the screens.

A visual presentation typically includes multiple graphics components. The layered display devices may cooperate to provide 3D visual presentation by each displaying their own 3D graphics components or parts. For example, the multiple display devices may cooperate to display a 3D image by separately displaying different parts of the whole image on each of the display screens. In this case, a proximate display device shows one portion of the 3D image, while a distal or underlying display device shows another portion of the 3D image. As result, the gaming machine shows a 3D representation that is formed in three physical or actual dimensions: an x and y of the proximate display screen, an x and y of the distal display screen, and a depth, D, or z dimension of the image that is at least partially dependent on the distance between the two display devices. A third display device may be used to add another set of x and y dimensions and another depth, D, along the z dimension.

In one embodiment, each of the display devices shows virtual 3D images, and controls the perception of depth in each screen. This permits collective 3D images provided by the multiple display devices to cause a player to perceive a depth that is based or derived from a combination of virtual depth and the actual depth, D. For example, a gaming machine processor may use or multiply the actual depth, D, by a factor to generate a perceived depth in rendered 3D images for each of the screens that cooperates with the actual depth, D. This permits a game designer to change the perceived depth of the entire 3D image by manipulating the virtual depth to thereby modify the perceived combination of virtual and actual depths.

Figure 5A:
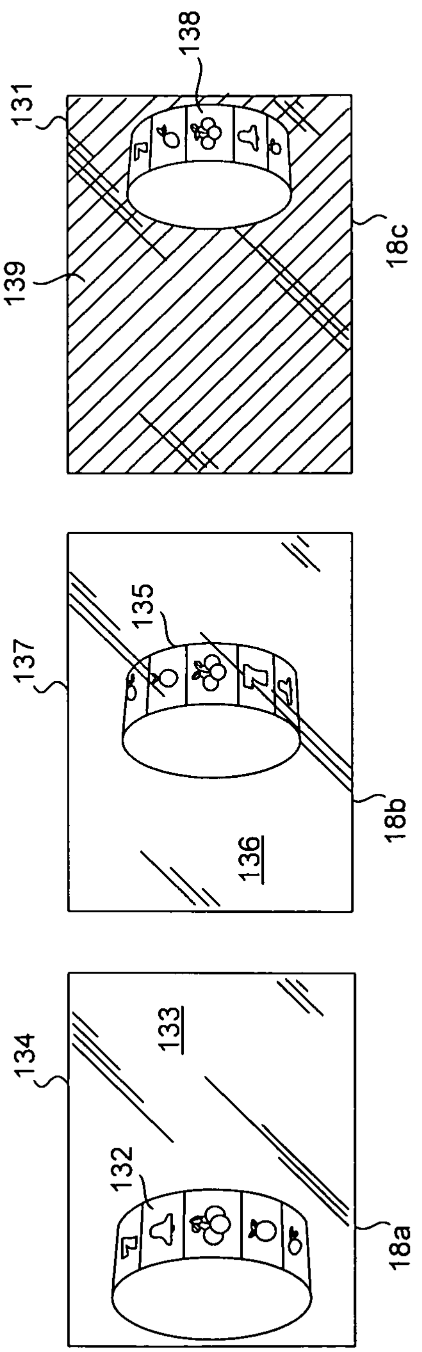
FIGS. 5A-5D show exemplary video data output on the display devices and gaming machine of FIG. 1A.
Figure 5B:
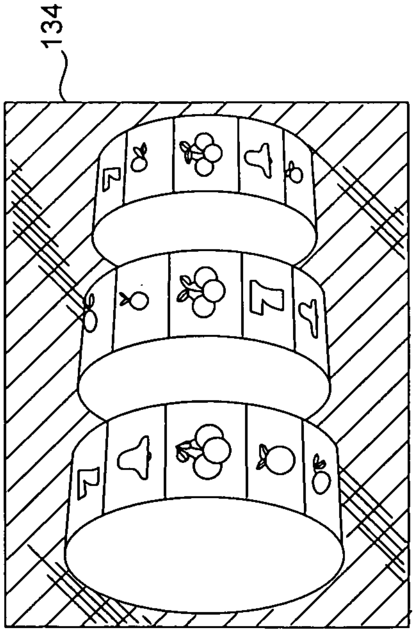

FIGS. 5A and 5B show exemplary video data output on the display devices 18 and gaming machine 10 of FIG. 1A. Again, gaming machine 10 of FIG. 1A includes an exterior or frontmost display device 18*a*, a middle or intermediate display device 18*b*, and an interior or backmost display device 18*c*. The frontmost display device 18*a* displays a virtual 3D first reel image 132 on a portion of its display screen 134. All other portions 133 of screen 134 are translucent or transparent. The intermediate display device 18*b* shows a virtual three dimensional reel image 135 on one portion of its display screen 136, while all other portions 137 of screen 136 are translucent or transparent. The third display device 18*c* displays a virtual 3D reel image 138 and a background image 139 covering the portions of its screen 131 outside reel image 138. These three display screens 134, 137 and 131 simultaneously display each respective image to enable a player to see an overall 3D image, as illustrated in the FIG. 5B (illustrated in two dimensions, that is), of all three reels in a 3D format by looking through the first display screen 134.

Figure 5C:
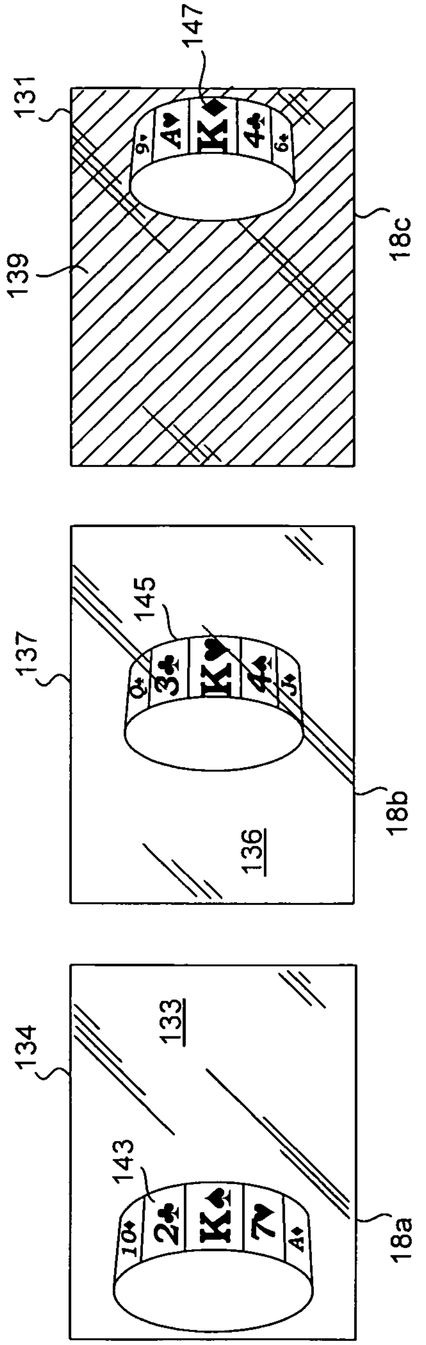
Figure 5D:
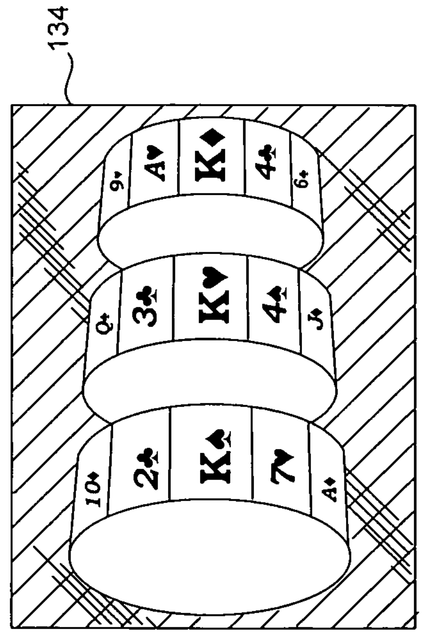

FIGS. 5C and 5D show exemplary poker video data output on the display devices 18 and gaming machine 10 of FIG. 1A in accordance with another specific embodiment. As will be described in further detail below, the video nature of the present invention allows games and video data to be reconfigured at will by a controller on the gaming machine. For example, a reel game (e.g. FIG. 5B) or video poker game (e.g. FIG. 5D) may be selected in real-time. This is useful for reconfigurable gaming machines that offer multiple games and select a specific game for play when a player approaches a gaming machine (and is identified by the machine); in this case, the video reels may reset immediately for a game for that person. For the video poker game shown in FIG. 5D, the frontmost display device 18*a* displays a virtual 3D first reel image 143 with poker card values. Again, all other portions 133 of screen 134 are translucent or transparent. The intermediate display device 18*b* shows a virtual three dimensional reel image 145 on one portion of its display screen 136, while all other portions 137 of screen 136 are translucent or transparent. The third display device 18*c* displays a virtual 3D reel image 147 with poker card values and a background image 149 covering the portions of its screen 131 outside reel image 147. Display screens 134, 137 and 131 simultaneously display each respective poker image to enable a player to see an overall 3D image, as illustrated in the FIG. 5D, for a 3-card poker game. The number of reels may also change from 3 to 5 or 7 to permit a 5-card poker game or a 7-card poker game. Configuration of the reels on each screen may vary. For a five card game, two reels may be included on front screen 134, two reels on middle screen 137 and one reel on the back screen 131. Other card and reel configurations are suitable for use herein.

Although it is not fully apparent by viewing the 2D representation shown in FIGS. 5B and 5D, the overall video display (whether still or animated) of FIG. 5B provides an engaging 3D representation because the three reel images are formed in different planes and actual 3D space. Specifically, the representation of reel 132 being closer to the player than the reel 135 is based upon and determined by the actual distance between the first display screen 134 and the second display screen 137. Similarly, the representation of the reel 135 being closer to the player than the reel 138 is based upon and determined by the actual distance (not shown), which separates the second display screen 137 from the third display screen 139.

Thus, by simultaneously displaying different images (partially or wholly) on layered display devices of the present invention, the gaming machine achieves 3D video output in three actual dimensions. A person can physically move and change their perspective relative to the layered displays and look around the reel 132 on the first display screen 134, thus gaining a different view of reel image 135 the intermediate display screen 136 and a different view of reel 138.

Curvature of the interior display device 18*d* of FIG. 1B also adds real depth for the creation of 3D visual output. For reels, the reel symbols pass from top to bottom (or vice versa) of the curved device and thus move towards and away from the viewer in real space as they do so, which not only simulates traditional mechanical reels better, but also adds to real 3D effects of the layered displays. This type of three-dimensional representation is highly engaging and interesting to players because symbols on the reel are actually formed or generated in all three dimensions.

In another 3D video output embodiment, an image of a card dealer, displayed on an interior display device, deals cards that are shown on an exterior display device. This provides a person with a three-dimensional view of the card game in which the cards physically come forward between the display devices.

In a specific embodiment, a gaming machine includes a sensor such as a camera or other suitable device to detect position of a player or the player's head. When the player's head moves (e.g., translates or rotates left, right, up or down), images on one or more of the display devices change to provide a virtual impression to the player that the player can look around an object or images on the display devices, which provides a better impression of 3D reality.

One of the display devices in a layered arrangement may also output live video such as television or a movie (or parts of either). For example, the television or movie video may be output on a rear display while a game is played on a proximate display. This permits a person to watch television or a movie while playing a game at a gaming machine, without changing position or line of sight to switch between the game and live video. The live video may also be related to the game being played to enhance enjoyment of that game, e.g., a science fiction movie related to a science fiction game being played or a 1960's television show related to a 1960's television game. The video may also play commercials for the gaming establishment, such as advertisements and infomercials for businesses related to a casino or businesses that pay for the advertising opportunity. Advertisements may include those for a local restaurant, local shows, -house offers and promotions currently offered, menus for food, etc.

Figure 6A:
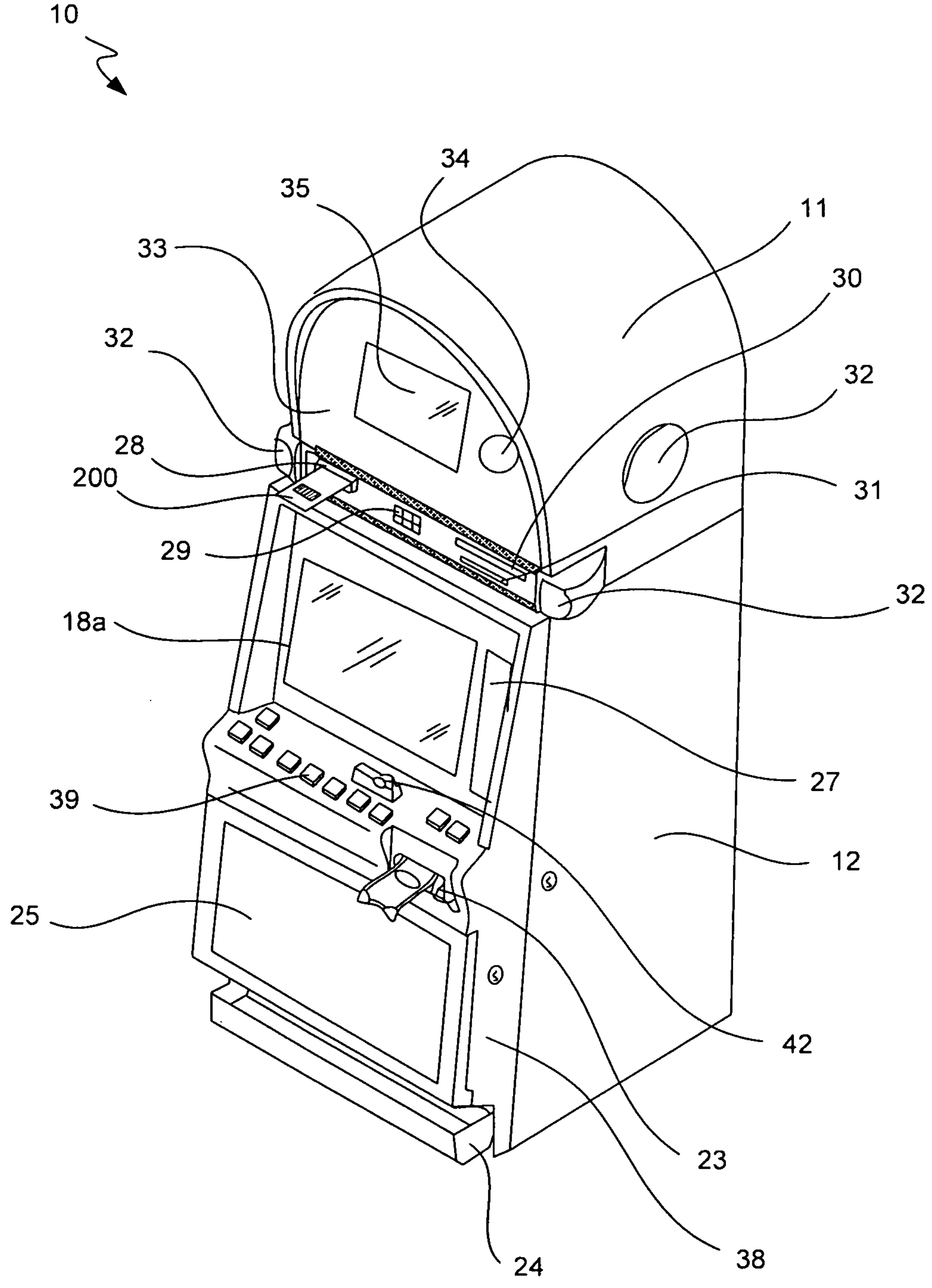
FIG. 6A is a perspective view of a gaming machine in accordance with one embodiment of the present invention.
Figure 6B:
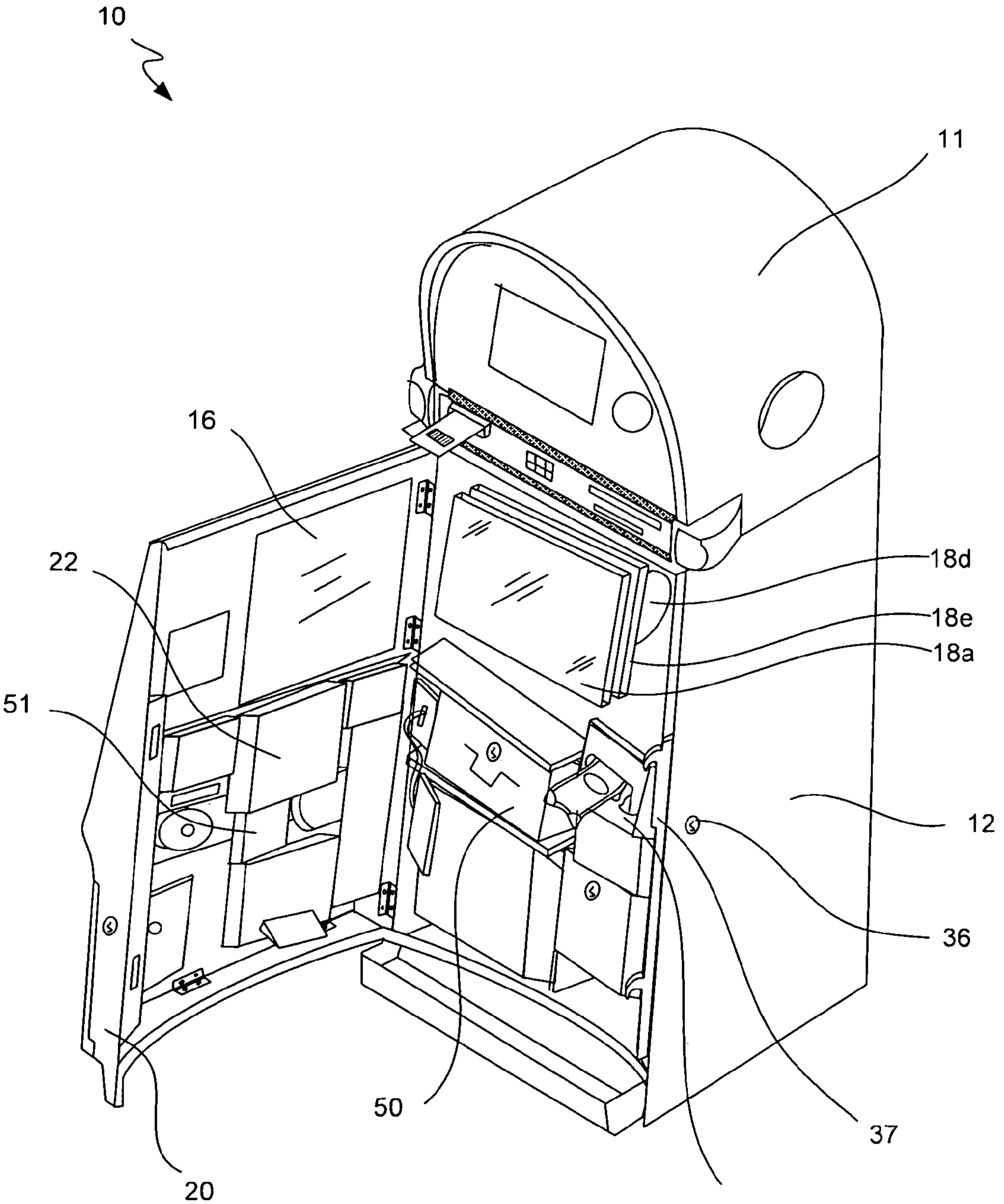
FIG. 6B shows a display device arrangement in accordance with another embodiment of the present invention.

The present invention may employ a wide variety of gaming machines. For example, the present invention may be used with a gaming machine provided by IGT of Reno, Nev. Gaming machines from other manufacturers may also employ layered display systems as described herein. FIGS. 6A and 6B illustrate an exemplary gaming machine 10 for use according to one embodiment of the present invention.

Gaming machine 10 includes a top box 11 and a main cabinet 12, which generally surrounds the machine interior and is viewable by users. Main cabinet 12 includes a main door 38 on the front of the machine, which opens to provide access to the interior of the machine. Attached to the main door are typically one or more player-input switches or buttons 39; one or more money or credit acceptors, such as a coin acceptor 42, and a bill or ticket scanner 23; a coin tray 24; and a belly glass 25. Viewable through main door 38 is the exterior video display monitor 18*a* and one or more information panels 27.

Top box 11, which typically rests atop of the main cabinet 12, may also contain a ticket printer 28, a keypad 29, one or more additional displays 30, a card reader 31, one or more speakers 32, a top glass 33 and a camera 34. Other components and combinations are also possible, as is the ability of the top box to contain one or more items traditionally reserved for main cabinet locations, and vice versa.

It will be readily understood that gaming machine 10 can be adapted for presenting and playing any of a number of games and gaming events, particularly games of chance involving a player wager and potential monetary payout, such as, for example, a wager on a sporting event or general play as a slot machine game, a keno game, a video poker game, a video blackjack game, and/or any other video table game, among others. While gaming machine 10 is usually adapted for live game play with a physically present player, it is also contemplated that such a gaming machine may also be adapted for remote game play with a player at a remote gaming terminal. Such an adaptation preferably involves communication from the gaming machine to at least one outside location, such as a remote gaming terminal itself, as well as the incorporation of a gaming network that is capable of supporting a system of remote gaming with multiple gaming machines and/or multiple remote gaming terminals.

Gaming machine 10 may also be a "dummy" machine, kiosk or gaming terminal, in that all processing may be done at a remote server, with only the external housing, displays, and pertinent inputs and outputs being available to a player. Further, it is also worth noting that the term "gaming machine" may also refer to a wide variety of gaming machines in addition to traditional free standing gaming machines. Such other gaming machines can include kiosks, set-top boxes for use with televisions in hotel rooms and elsewhere, and many server based systems that permit players to log in and play remotely, such as at a personal computer or PDA. All such gaming machines can be considered "gaming machines" for purposes of the present invention and following discussion, with all of the disclosed metering techniques and devices being adaptable for such uses of alternative gaming machines and devices.

With reference to FIG. 1B, the gaming machine of FIG. 1A is illustrated in perspective view with its main door opened. In additional to the various exterior items described above, such as top box 11, main cabinet 12 and primary video display monitor 26, gaming machine 10 also comprises a variety of internal components. As will be readily understood by those skilled in the art, gaming machine 10 contains a variety of locks and mechanisms, such as main door lock 36 and latch 37. Internal portions of coin acceptor 22 and bill or ticket scanner 23 can also be seen, along with the physical meters associated with these peripheral devices. Processing system 50 includes computer architecture for interacting with and implementing a retinal image system, as will be discussed in further detail below.

When a person wishes to play a gaming machine 10, he or she provides coins, cash or a credit device to a scanner included in the gaming machine. The scanner may comprise a bill scanner or a similar device configured to read printed information on a credit device such as a paper ticket or magnetic scanner that reads information from a plastic card. The credit device may be stored in the interior of the gaming machine. During interaction with the gaming machine, the person views game information using a video display. Usually, during the course of a game, a player is required to make a number of decisions that affect the outcome of the game. The player makes these choices using a set of player-input switches.

After the player has completed interaction with the gaming machine, the player may receive a portable credit device from the machine that includes any credit resulting from interaction with the gaming machine. By way of example, the portable credit device may be a ticket having a dollar value produced by a printer within the gaming machine. A record of the credit value of the device may be stored in a memory device provided on a gaming machine network (e.g., a memory device associated with validation terminal and/or processing system in the network). Any credit on some devices may be used for further games on other gaming machines 10. Alternatively, the player may redeem the device at a designated change booth or pay machine.

A gaming machine of the present invention can be used to play any primary game, bonus game, progressive or other type of game. In one embodiment, the gaming machine includes a game that enables a player to have inputs and interaction that are associated with a depth or z-dimension extending into and through the face of a frontmost display surface. This type of 3D game play can be suitable for wagering games which, by their original design, are 3D, such as blackjack, poker, roulette, and other casino games including, but not limited to, skill and perceived-skill games. Other wagering games can enable a player to cause different events to occur based upon how hard the player pushes on a touch screen. For example, a player could cause reels or objects to move faster by pressing harder on the exterior touch screen. In these types of games, the gaming machine can enable the player to interact in the 3D by varying the amount of pressure the player applies to a touchscreen.

In another embodiment, the gaming machine enables a player to play two or more games on two or more display screens at the same time or at different times. For example, a player can play two related games on two of the display screens simultaneously. In another example, once a player deposits currency to initiate the gaming machine, the gaming machine may enable the player to chose from one or more games to play on different screens. In yet another example, the gaming machine can include a multi-level bonus scheme that enables a player to advance to different bonus rounds that are displayed and played on different display screens.

Some gaming machines may include a touchscreen that permits force differentiation that allows a person to separately access each display layer in a layered display configuration. This includes gaming machine software and control that reads the amount of force applied by a person and reactively associates this force with video data on a particular screen or layer.

As indicated above, a gaming machine of the present invention also enables a person to view information and graphics generated on one display screen while playing a game that is generated on another display screen. Such information and graphics can include game paytables, game-related information, entertaining graphics, background, history or game theme-related information or information not related to the game, such as advertisements. The gaming machine can display this information and graphics adjacent to a game, underneath or behind a game or on top of a game. For example, a gaming machine could display paylines on the frontmost display screen and also display a reel game on an underlying display screen, and the paylines could fade in and fade out periodically.

A gaming machine includes one or more processors and memory that cooperate to output games and gaming interaction functions from stored memory. FIG. 7 illustrates a control configuration for use in a gaming machine in accordance with another specific embodiment of the present invention.

Processor 132 is a microprocessor or microcontroller-based platform that is capable of causing a display system 18 to output video data such as symbols, cards, images of people, characters, places, and objects which function in the gaming device. Processor 132 may include a commercially available microprocessor provided by a variety of vendors known to those of skill in the art. The present invention may also include one or more application-specific integrated circuits (ASICs) or other hardwired devices. Furthermore, although the processor 132 and memory device 134 reside on each gaming machine, it is possible to provide some or all of their functions at a central location such as a network server for communication to a playing station such as over a local area network (LAN), wide area network (WAN), Internet connection, microwave link, and the like.

Memory 134 may include one or more memory modules, flash memory or another type of conventional memory that stores executable programs that are used by the processing system to control components in a layered display system. Memory 134 can include any suitable software and/or hardware structure for storing data, including a tape, CD-ROM, floppy disk, hard disk or any other optical or magnetic storage media. Memory 134 may also include a) random access memory (RAM) 140 for storing event data or other data generated or used during a particular game and b) read only memory (ROM) 142 for storing program code that controls functions on the gaming machine such as playing a game.

A player uses one or more input devices 138, such as a pull arm, play button, bet button or cash out button to input signals into the gaming machine. One or more of these functions could also be employed on a touch screen. In such embodiments, the gaming machine includes a touch screen controller **16*a* that communicates with a video controller 146 and processor 132**. A player can input signals into the gaming machine by touching the appropriate locations on the touchscreen.

Processor 132 is also connected to a currency acceptor 116 such as the coin slot or bill acceptor. Processor 132 can operate instructions that require a player to deposit a certain amount of money in order to start the game.

Although the processing system shown in FIG. 7 is one specific processing system, it is by no means the only processing system architecture on which the present invention can be implemented. Regardless of the processing system configuration, it may employ one or more memories or memory modules configured to store program instructions for gaming machine network operations and operations associated with layered display systems described herein. Such memory or memories may also be configured to store player interactions, player interaction information, and other instructions related to steps described herein, instructions for one or more games played on the gaming machine, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

The processing system may offer any type of primary game, bonus round game or other game. In one embodiment, a gaming machine permits a player to play two or more games on two or more display screens at the same time or at different times. For example, a player can play two related games on two of the display screens simultaneously. In another example, once a player deposits currency to initiate the gaming device, the gaming machine allows a person to choose from one or more games to play on different display screens. In yet another example, the gaming device can include a multi-level bonus scheme that allows a player to advance to different bonus rounds that are displayed and played on different display screens.

Figure 8:
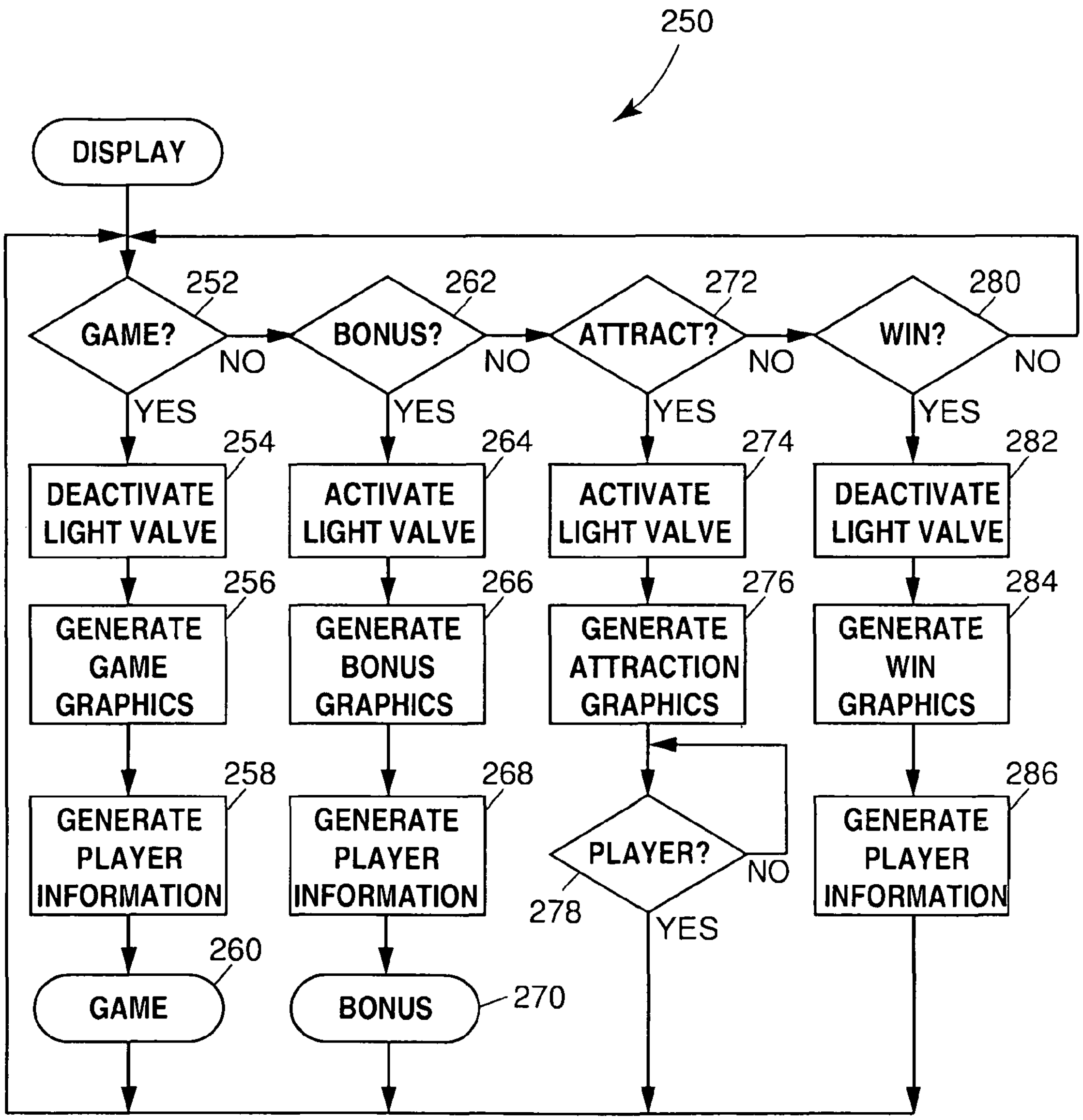
FIG. 8 is flowchart or software routine of a display routine that may be executed by a gaming machine controller in accordance with a specific embodiment of the present invention.

The present invention also relates to methods imparted using a gaming machine with a layered display. FIG. 8 is flowchart or software routine of a display routine 250 that may be executed by a gaming machine controller in accordance with a specific embodiment of the present invention. FIG. 8 also makes reference to the display system arrangement of FIG. 1C.

At block 252, the routine may determine whether a game has been initiated. If a game has been initiated, the routine may deactivate light valve 93 and cause the light valve to become transparent at block 254. Depending on the particular light valve 93 being utilized, deactivating the light valve 93 may involve either applying (or increasing) a current to the light valve 93 or discontinuing (or decreasing) the current being applied to the light valve 93.

At block 256, the routine generates graphics on the rear display unit 92 related to the game. If provided with video slot machine reels, the reels of the rear display unit 92 are illuminated. Other video output and graphics that correspond to the game display may be activated on the rear display device 92 as part of the display. Additional graphics may also be generated on the front video display device 90, and are superimposed over the graphics of the rear display device 92. At block 258, the routine generates graphics such as player information (e.g., player identification, cumulative winnings, a player profile, favorite games, etc.), game information, advertisements, graphics related to the game, etc., which are displayed on the front video display device 90. At block 260, a game routine is performed and output on the front and rear display units 90, 92. The video is updated accordingly as the game routine proceeds.

The display routine 250 may further determine whether a bonus game has been initiated at block 262. If the bonus game has been initiated, the routine activates the light valve 93 at block 264, causing the light valve to become opaque and obscuring the player's view of the rear display device 92. The routine then generates graphics to play the bonus game on the front video display device 90 at block 266 and further generate player information on the front video display device at block 268. If provided with video slot machine reels, the video reels of the rear display device 92 may be de-illuminated. At block 270, the bonus game routine is executed.

The display routine 250 may further determine whether or not an attraction sequence is being performed. The attraction sequence may include a scrolling list of games playable on the game machine and/or video images of various games being played, such as video poker, video blackjack, video slots, video keno, video bingo, etc. The attraction sequence may further include the activation of the light valve 93 at block 274, thereby causing the light valve 93 to become opaque to obscure the view of the rear display device 92. Attraction graphics, such as the scrolling list of games and/or video images of various games being played, may be generated on the front video display device 90 at block 276. During the attraction sequence, if a person makes any input to the gaming machine as determined at block 278, the attraction sequence terminates and control returns to block 252 to determine whether or not a game has been initiated.

The display routine 250 may also determine whether a player has won during a game routine at block 280. The win determination may include any nonzero payout determination as determined during a game routine. In one example, the win determination relates to a predetermined payout amount such as a jackpot. If the player has won, as determined at block 280, the routine deactivates the light valve 93, causing the light valve to become transparent and allowing the player to view the rear display device 92. At block 284, the routine generates graphics on the rear display device 92 and/or the front video display device 90 corresponding to a value payout display to indicating that the player has won. If provided with video slot machine reels, the video reels of the rear display device 92 may be illuminated and de-illuminated to appear flashing (similar to old mechanical reels). Player information may be generated on the front video display device 90 at block 286, including updated graphical information accounting for the payout amount.

Although the display routine 250 has been described as including various combinations of generating images on the display units 90, 92 and activating/deactivating the light valve 93, based on the occurrence of a game routine, a bonus routine, an attraction sequence, or a winning game, those of ordinary skill in the art will recognize that additional criteria may cause such combinations to be initiated. For example, some game routines may be executed to include a game display on the rear display device 92, whereas other game routines may be executed to include a game display on the front display device 90. In one example, the rear display device 92 outputs a video slots game routine that resembles a mechanical slots game, whereas the front display device 90 outputs a video game routine such as video poker, video blackjack, video slots, video keno, video bingo, or any other video game routine. When a video game routine is to be performed, which may result from a player selection of such a game routine, the light valve 93 is activated, thereby causing the light valve 93 to become opaque to obscure the view of the rear display device 92. Other combinations that provide specific game routines to be displayed on each display device 90, 92 may also be employed.

Additionally, various combinations and permutations of generating images on the display units 90, 92 and activating/deactivating the light valve 93 may be performed for the above occurrences or other criteria. Those of ordinary skill in the art will also recognize that each criteria (e.g., game, bonus game, attraction, win, etc.) may be embodied in its own routine or incorporated into other routines such as the main operating routines 200, 230.

As mentioned above, game output may also include downloading instructions for one or more games to the gaming machine. The present invention also relates to a method of reconfiguring a gaming machine that includes reconfiguring the display system to use a different number of display devices and/or a different game. For example, a network connection on the gaming machine may download software for a game output on a front screen and download software for a game output on a back screen. The downloaded games may include any game/game, game/bonus, game/pay configuration, front/back combination as described above. The downloaded instructions may also specify how the games will be displayed in a common line of sight.

In additional embodiments, two or more "game presentation devices" (conventional flat video displays as well as rotatable reels, curved stationary displays, cylindrical stationary displays, etc.) are provided in a gaming machine such that at least one of them can be moved into and out of a viewing position within a gaming machine display compartment. The display compartment is a portion of a gaming machine sized to accommodate game presentation devices and permitting at least one of them to be moved into and out of position for user viewing. It should be understood that game presentation devices include various types of "mechanical" or "non-video" game presentation devices that are not necessarily slot reels.

Viewing position refers to the position of a presentation device where a user/player normally views a game presentation on a gaming machine. As discussed above, some embodiments of the invention employ video displays and/or reel displays on a common line of sight such that both can be viewed simultaneously by the user. In certain of the embodiments now described, when two or more presentation devices are aligned along a common line of sight, only the first one is visible to players. This may be the case, when the front device (the one closest to the user along the line of sight) is opaque or semi-transparent. Of course, this need not be the case, as the front device can be transparent but also movable. Or the front device can be transparent and the rear device can be movable into and out of viewing position.

Regardless, it will frequently be the case that the two game presentation devices (the slot reels and the video screen) are dedicated to presenting different aspects of the gaming machine experience. As examples, the two game presentation devices can present (1) different types of games (e.g., slot game versus video poker or primary game versus bonus game) and/or (2) different features within a single game (different graphics associated with different levels of bets and/or different themes associated with different win amounts). In certain embodiments, the player selects one of two or more games or game presentations he or she desires. The gaming machine then determines whether to present a video display or a reel presentation device, as these devices may be associated with only one or more games or game presentations. Based on the determination, the machine may move the video display or reel presentation device as necessary to effect the player's selection.

As is apparent from the above discussion of FIGS. 6A and 6B, many gaming machines have internal compartments within a chassis. In the embodiments now described, one or more internal compartments serve as the display compartments which hold the display devices in viewing position and/or store them in non-viewing position.

Moving a game presentation device into and out of viewing position can be accomplished by translation, rotation or pivot, as well as swinging on an arm. The movement may constitute a slight mechanical movement which slightly perturbs the position of the device as well as complete displacements in which the entire device is moved out of viewing position and stored at an appropriate location within a display compartment. A telescoping arrangement may also be employed to move one or both presentation devices. Slight mechanical movement may allow for backlighting of an LCD display screen for example.

Various mechanisms may be employed for moving the video display screen into and out of viewing position. The same is true of the reel presentation device. In some embodiments, the mechanism for moving includes a motor drive for moving the video display device into and out of the common line of sight. Similarly, the mechanism for moving may include a motor drive for moving the reels or reel display into and out of the common line of sight.

Various different drive mechanisms (either open or closed loop) may be employed for translating or otherwise moving movable displays. These drive mechanisms may include, but are not limited to, ballscrew and jacknut devices, belt and pulley devices, electromagnetic linear drive mechanisms, cam and follower devices, gear drives, leadscrews, etc. The drivers for such systems may include, for example, stepper motors, server motors, gear motors, pneumatic drivers, etc. Each of the different types of drivers may be implemented either with or without mechanical and electromechanical encoders and other feedback technologies, as desired.

Certain embodiments make use of a telescoping arm adapted to push or pull the reel presentation device. In at least one implementation, a presentation device may be pivotally attached to a telescoping arm via pivot mechanism to allow additional freedom in moving the device.

Certain embodiments make use of hinged or pivot mounted arms that engage the outer edges (left and right when in an upright orientation) of a reel presentation device. In some cases, such arms swing the device between viewing and non-viewing positions. In other cases, the display screen and/or the reel presentation device moves along a rail or other guide attached to the gaming machine (e.g., directly attached to the chassis or attached to a frame within the chassis). Other mechanisms will be readily apparent to those of skill in the art.

Figure 9A:
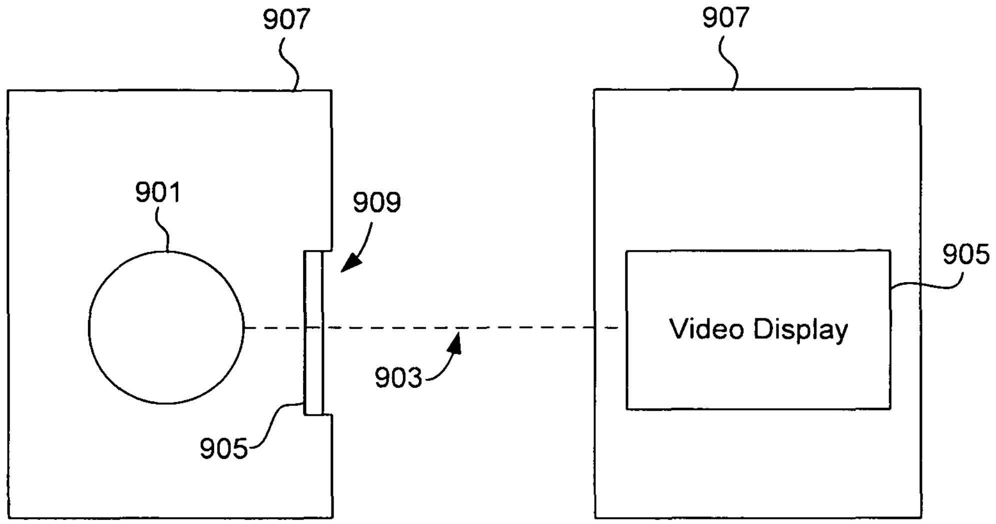
FIGS. 9A-9F depict examples of embodiments in which one or both of a video display screen and a reel type display are moved into and out of a viewing position. In these embodiments, the entire presentation device is moved into or out of viewing position depending on the circumstances.
Figure 9B:
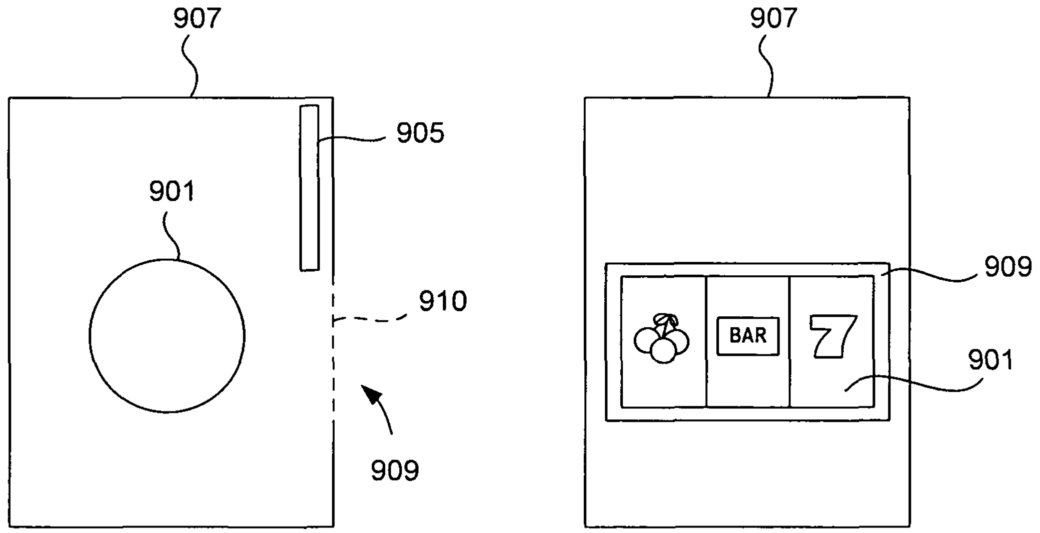
Figure 9C:
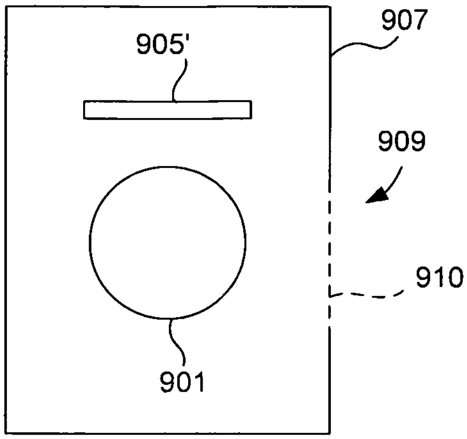
Figure 9D:
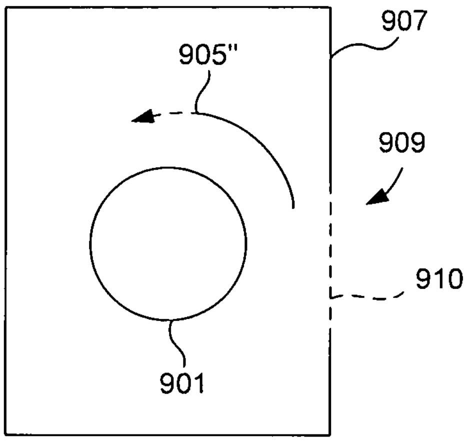
Figure 9E:
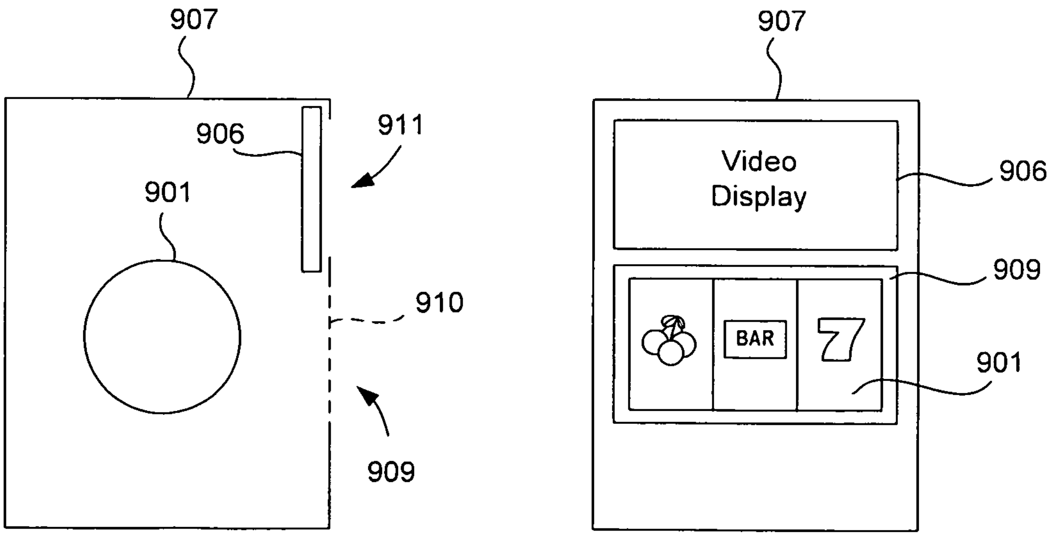

FIGS. 9A-9F depict examples of embodiments in which one or both of a video display screen and a reel type display are moved into and out of a viewing position. In these embodiments, the entire presentation device is moved into or out of viewing position depending on the circumstances. When a device is moved out of viewing position, it is typically hidden from view. However, in certain embodiments, the presentation device is moved to a different viewing position; e.g., from a primary viewing position to a secondary viewing position. An example of such embodiment is depicted in FIG. 9E. In addition, viewable aspects of the reel presentation and display devices may be combined for viewing by the user. For example, when the display device is moved out of normal viewing position in front of the reel presentation device, it may still present an image to the user (which is combined with the direct view of the reels) via an optical transmission device. In this manner the user perceives a combined view of the reel presentation and video display. The optical transmission device may include one or more of a projector, a mirror, a beam splitter, and the like. An example of a beam splitter used with a reel presentation device is presented in U.S. Pat. No. 6,517,437 issued Feb. 11, 2003, which is incorporated herein by reference for all purposes.

In FIGS. 9A-9F, a gaming machine chassis 907 is depicted in simplified fashion as a box. In these simple examples, the chassis serves to define a display compartment for holding presentation devices in viewing and non-viewing positions. Chassis 907 also includes a window or opening 909 through which a user can view either of the presentation devices. Hence, the chassis 907 depicted in these figures may serve as part of an external cabinet visible to users. It should be understood that the chassis is typically adapted to house a plurality of gaming machine components (not just displays) within or about the interior region. Note that FIGS. 9A, 9B, and 9E, each present two views, a side view on the left and a front view (from the perspective of a user during normal game play) on the right.

Note that in each of FIGS. 9A-9F, a reel presentation device 901 is intended to include any type of presentation device that displays spinning reels. This includes at least actual mechanically spinning reels, a flat video display (single or multi-layer) showing spinning reels, and curved video display (single or multi-layer). Video display device 905 (or 906 in FIG. 9E) is intended to include any type of substantially thin or flat display configured to present video content. LCDs, electroluminescent displays, electrochromic displays, light emitting diode displays (including OLEDs), plasma displays, field emission displays, digital micromirror devices (DMD), Light-Emitting Polymer (LEP) displays, CRT displays, and others are all contemplated as examples of the display 905. Further, the display may be framed and may exist in any shape consistent with the technology utilized the type of display being used. For example, an LCD may be cut into shapes such as circles, triangles, or any free-form shape desired.

The normal viewing position is along a line of sight such as that depicted in, e.g., FIG. 1B and FIG. 1C. In one phase of operation, as depicted in FIG. 9A, both a reel presentation device 901 and a video display screen 905 are provided on a common line of sight 903, with the display screen in front and visible to the user. One or both of device 901 and screen 905 will be visible through opening 909. If the video display screen is not transparent it will hide the reel device from view. When however the video screen is transparent, semi-transparent, or capable of being rendered temporarily transparent, the reel device will be visible or partially visible even when the video screen is positioned in front. Such arrangements have already been described in detail above. In the embodiment depicted in FIG. 9A, the reels will be obscured when the video display must is positioned in front.

When the video display screen is located out of the viewing position, it may be hidden from the player's view. In one embodiment, when the video display screen is in the non-viewing position, it is hidden from view in a region of the chassis and in the same plane of as when in the display position. This is depicted in FIG. 9B. In this embodiment, a video screen 905 simply slides upward into a slot or region in the display chamber. As shown in the right panel of FIG. 9B, the reel device 901 is then viewable through window 909.

In the embodiment of FIG. 9C, a video display screen 905' moves out of viewing position by a movement that includes pivoting to a position in which it is no longer in the plane it occupied when in the viewing position. Thus, for example, the video display screen may move to a position perpendicular to its display position and disposed above or below the reels or reel display. The pivoting motion may be accompanied by a translational motion, as appropriate, to effect positioning in a final non-viewing rest or home position. See FIG. 9C. Of course, the user's view will then be the same as that shown in the right panel (front view) of FIG. 9B.

Certain embodiments, such as the one depicted in FIG. 9D, employ a flexible video display screen 905". As such, the screen can move into and out of viewing position while bending. This may facilitate movement between viewing and non-viewing positions where the video screen moves out of the plane occupied during display and comes to rest above or below the reels. Less space for movement within the gaming machine chassis need be reserved for movement of the display screen in such embodiments. Note that when in the viewing position, the video screen is typically flat. In other words, the screen itself is flat or relatively flat when displaying video content. With a flexible video display screen embodiment, however, the screen may occupy a curved, bent or warped configuration when in the viewing position. Examples of flexible display screens include various active and passive matrix designs formed on flexible substrates and employing both a flexible display front plane (containing light emitting or modulating pixels) and a flexible back plane (containing the pixel control circuitry). OLED and electroluminescent displays can be formed on flexible substrates. Other display types such as liquid crystal displays (LCDs) and electrophoretic displays and rotating element displays can also be made on flexible substrates.

In certain embodiments, a video display screen 906 moves between a principal viewing position and a secondary viewing position (rather than between a viewing position and a non-viewing position). See the design depicted in FIG. 9E. As shown there, a principal viewing position is located in front of the reels or reel display 901 as described herein. In the secondary viewing position, video display screen 906 is still visible to the user/player, this time through a window or opening 911 located above opening 909. However, it is now positioned in a secondary position and the user can, in some embodiments, simultaneously view both the reels (or reel display) and the video display. The two game presentation components (the reels and the video display) are now located in different lines of sight. In some embodiments, the video display screen depicts pay tables or other ancillary information associated with the reel game.

Typically, in embodiments where the video screen moves into and out of position, a transparent screen 910 (e.g., a glass window) is provided in front of the reel presentation device (and/or in front of the secondary viewing position) so that direct access to the reel device or other part of the gaming machine interior is blocked after the video display is moved away. Screen 910 may include pay lines or other information to facilitate presentation of the game to the user. In some cases, screen 910 may itself be some form of transparent video display device.

Figure 9F:
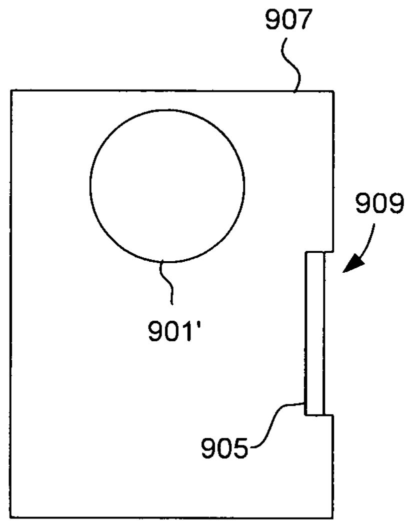

Yet another embodiment is depicted in FIG. 9F. As shown there, a reel presentation device 901' is configured to move into and out of viewing position. In the depicted embodiment, the reel device moves to an upper corner of the display compartment so that it is clearly out of the player's line of sight. Of course, in other embodiments, the movement of the reel device need not be so pronounced. Combining movement with a change in back lighting and/or transparency or other optical effects of video screen 905 can create the same effect—i.e., the reel device is no longer visible or no longer contributes significantly to the player's viewing experience. Embodiments such as those of FIG. 9F, where the reel presentation device moves, may be particularly advantageous when used with transparent or semitransparent video display screens.

As mentioned, in the embodiments described here, the one or more reels or the reel display may be mechanically rotatable reels. Alternatively, the reels or the reel display may be a curved surface of a digital or video display device. In certain embodiments, the reels or the reel display include an organic light emitting diode (OLED) device for displaying the symbols. For example, the reels may comprise an OLED device on a mechanical reel. Or a reel display may comprise an OLED for displaying video images of spinning reels on a curved or flat screen. An electroluminescent display for displaying reel symbols may be used in place of or together with an OLED display in reels or a reel display. In some cases, a projection-type display device is configured to cast an image of reel symbols onto the reels or the reel display. The display device is typically provided within the gaming machine chassis.

In certain embodiments, the video reel display and/or video display device are configured to cooperate in displaying three-dimensional visual output that has an actual three-dimensional depth along the common line of sight. See e.g., US Published Patent application no. 20060103951 filed Mar. 17, 2003, which is incorporated herein by reference for all purposes. In certain embodiments, the one or more reels or the reel display comprises a multilayer display. In some cases, the video display device comprises a non-transparent liquid crystal display. Another feature that may be included in apparatus is a touch screen proximately located along the common line of sight and positioned to allow a player to select game options by touching regions on the video display device along the common line of sight.

The gaming machines of FIGS. 9A-9F typically include some form of processor configured to execute instructions from memory that permit game play on the gaming machine. The instructions also indicated how, when, and where the individual presentation devices move. Separate display positioning logic and/or drivers may be dedicated for this purpose. For example, the architecture presented in FIG. 7 may include one or more display positioning drivers.

In some embodiments, the gaming machine also includes game presentation logic for execution on the processor to present video information on the video display device pertinent to said game play on the gaming machine. The game presentation logic may also determine whether the video display device or the reels should be active at any given time for presenting game information. Typically, the game presentation logic includes instructions for controlling display of symbols on the reels or reel display.

As with all embodiments described herein, the gaming machines depicted in the embodiments of FIGS. 9A-9F may be incorporated into a network of gaming machines in communication with one or more servers providing administrative functions such security, accounting, and/or game configuration. In certain aspects game presentation and/or game outcome logic may be downloaded from an external server to one or gaming machines as depicted in FIGS. 9A-9F.

In accordance with the embodiments presented in FIGS. 9A-9F, the invention may involve a sequence of operations for presenting a particular game on a gaming machine. Frequently, the sequence is initiated by determining that an aspect of a game is to be displayed on either (i) one or more reels or a reel display mounted to or within a cabinet of gaming machine and/or (ii) a video display device positioned in front of and along a common line of sight with respect to the reels or reel display. For example, a user may select a slot reel game. Thereafter, the gaming machine, acting under control of process logic, moves either the video display device or the reel presentation device, or both into and/or out of position along the common line of sight depending upon which one is identified to display the aspect of the game. The machine can then execute instructions that permit game play, as appropriate, on the gaming machine. To implement these operations, the gaming machine may employ on board or external game presentation logic which typically executes on the gaming machine.

In certain embodiments, determining that an aspect of a game is to be displayed involves determining which of two different types of game is to be displayed. Based on this, the gaming machine determines whether to move (i) the video display device or (ii) the reels presentation device. For example, when a slot game type is selected, the reel presentation device may be moved into position (and/or the video display may be moved out of position) along the common line of sight.

In some embodiments, one or both game presentation devices may be automatically moved during game play between the viewing and non-viewing positions. This may elicit greater interest and excitement from the player and/or spectators during game play. Of course, the presentation devices may also be moved at other times (e.g., not during game play), in order, for example, to attract attention or to elicit greater interest and excitement from persons in a surrounding area, e.g., a casino.

A wide range of gaming machine designs may take advantage of movable displays embodiments of the invention. For example, some suitable gaming machines have top boxes and/or player tracking features. Further, some gaming machines are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. Further a gaming machine or server may include gaming logic for commanding a remote gaming device to render an image from a virtual camera in a 3-D gaming environments stored on the remote gaming device and to display the rendered image on a display located on the remote gaming device. Those of skill in the art will understand that the present invention, as described below, can be deployed on most any gaming machine environment now available or hereafter developed.

CONCLUSION

Although the foregoing invention has been described in some detail for purposes of clarity of understanding, it will be apparent that certain changes and modifications may be practiced without departing from the spirit and scope of the invention as defined in the claims. For instance, while the gaming machines of this invention have been depicted as having a display screen physically viewed through a vertical glass panel attached to a main gaming machine cabinet, the use of gaming devices in accordance with this invention is not so limited. For example, the display screen features may be provided on a table top gaming machine where the display screen is viewed through a horizontal glass panel. Further, features of the invention described herein may be provided alone or in any combination.

What is claimed is:

1. A gaming machine comprising:

an external cabinet defining an interior region of the gaming machine, the external cabinet adapted to house a plurality of gaming machine components within or about the interior region;

a processor configured to execute instructions from memory that permit game play on the gaming machine;

a reel presentation device mounted to or within said external cabinet;

a video display device positioned in front of and along a common line of sight with respect to the reel presentation device such that a player, while positioned for playing a game on the gaming machine, can view either the video display device or the reel presentation device through a viewing window of said external cabinet along the common line of sight;

game presentation logic for execution on the processor to present video information on the video display device pertinent to said game play on the gaming machine; and a mechanism configured to move both the video display device and the reel presentation device into and out of a viewing position along the common line of sight, such that the video display device and the reel presentation device can be moved to a different location within said external cabinet wherein they are no longer viewable by a player through said viewing window.

2. The gaming machine of claim 1, wherein the reel presentation device comprises a curved surface of a digital display device.

3. The gaming machine of claim 1, wherein the reel presentation device comprises mechanically rotatable reels.

4. The gaming machine of claim 1, wherein the reel presentation device comprises a video reel display.

5. The gaming machine of claim 4, wherein the video reel display and the video display device are configured to cooperate in displaying three-dimensional visual output that has an actual three-dimensional depth along the common line of sight.

6. The gaming machine of claim 1, wherein the reel presentation device comprises a multilayer display.

7. The gaming machine of claim 1, wherein the video display device comprises a non-transparent liquid crystal display.

8. The gaming machine of claim 1, wherein the game play comprises playing a slot game.

9. The gaming machine of claim 1, wherein the game play comprises playing a game of chance selected from the group of a video card game, baccarat, video pachinko, a lottery, keno, and a bingo game.

10. The gaming machine of claim 1, wherein the mechanism comprises a motor drive configured to move the video display device into and out of the common line of sight.

11. The gaming machine of claim 1, wherein the mechanism comprises a motor drive configured to move the reel presentation device into and out of the common line of sight.

12. The gaming machine of claim 1, wherein the game presentation logic comprises instructions for controlling a display of symbols on the reel presentation device.

13. The gaming machine of claim 12, wherein the reel presentation device comprises an OLED device for displaying the symbols.

14. The gaming machine of claim 12, wherein the reel presentation device comprises an OLED device on a mechanical reel.

15. The gaming machine of claim 12, wherein the reel presentation device comprises an electroluminescent display for displaying the symbols.

16. The gaming machine of claim 12, further comprising a projection-type display device configured to cast an image of reel symbols onto the reel presentation device.

17. The gaming machine of claim 1, further comprising a touch screen proximately located along the common line of sight and positioned to allow a player to select game options by touching regions on the video display device along the common line of sight.

18. A method of presenting a game on a gaming machine, the method comprising:

determining that an aspect of a game is to be displayed on either (a) a reel presentation device mounted to or within a cabinet of the gaming machine or (b) a video display device positioned in front of and along a common line of sight with respect to the reel presentation device such that a player, while positioned for playing a game on the gaming machine, can view either the video display device or the reel presentation device along the common line of sight through viewing window of said cabinet;

moving both the video display device and the reel presentation device into and out of position along the common line of sight depending upon the aspect of the game to be displayed, such that the video display device and the reel presentation device can be moved to a different location within said cabinet wherein they are no longer viewable by a player through said viewing window; and executing instructions that permit game play on the gaming machine.

19. The method of claim 18, wherein the game machine further comprises game presentation logic for execution on a processor of the gaming machine, wherein the game presentation logic is configured to present video information on the video display device pertinent to said game play on the gaming machine.

20. The method of claim 18, further comprising a mechanism configured to move both the video display device and the reel presentation device into and out of position along the common line of sight.

21. The method of claim 18, wherein the reel presentation device comprises a curved surface of a digital display device.

22. The method of claim 18, wherein the reel presentation device comprises mechanically rotatable reels.

23. The method of claim 18, wherein determining that an aspect of a game is to be displayed comprises determining which of two different types of game is to be displayed and wherein moving the video display device and the reel presentation device into and out of position is determined based on the type of game to be displayed.

24. The method of claim 23, wherein the reel presentation device is moved into position along the common line of sight when a slot game type is selected.

25. A system comprising one or more gaming machines on a network, wherein at least one of the gaming machines comprises:

an external cabinet defining an interior region of the gaming machine, the external cabinet adapted to house a plurality of gaming machine components within or about the interior region;

a processor configured to execute instructions from memory that permit game play on the gaming machine;

a reel presentation device mounted to or within said external cabinet;

a video display device positioned in front of and along a common line of sight with respect to the reel presentation device such that a player, while positioned for playing a game on the gaming machine, can view either the video display device or the reel presentation device along the common line of sight through a viewing window of said external cabinet;

game presentation logic for execution on the processor to present video information on the video display device pertinent to said game play on the gaming machine; and a mechanism configured to move both the video display device and the reel presentation device into and out of a viewing position along the common line of sight, such that the video display device and the reel presentation device can be moved to a different location within said external cabinet wherein they are no longer viewable by a player through said viewing window.

26. The system of claim 25, wherein the reel presentation device comprises a curved surface of a digital display device.

27. The system of claim 25, wherein the reel presentation device comprises mechanically rotatable reels.

28. The system of claim 25, wherein the reel presentation device comprises a video reel display.

29. The system of claim 28, wherein the video reel display and the video display device are configured to cooperate in displaying three-dimensional visual output that has an actual three-dimensional depth along the common line of sight.

30. The system of claim 25, wherein the video display device comprises a non-transparent liquid crystal display.

31. The system of claim 25, wherein the mechanism comprises a motor drive configured to move the video display device into and out of the common line of sight.

32. The system of claim 25, wherein the mechanism comprises a motor drive configured to move the reel presentation device into and out of the common line of sight.

33. The system of claim 25, wherein the at least one gaming machine further comprises a touch screen proximately located along the common line of sight and positioned to allow a player to select game options by touching regions on the video display device along the common line of sight.

34. A gaming machine comprising:

an external cabinet defining an interior region of the gaming machine, the external cabinet adapted to house a plurality of gaming machine components within or about the interior region;

a processor configured to execute instructions from memory that permit game play on the gaming machine;

a reel presentation device mounted to or within said external cabinet;

a video display device positioned in front of and along a common line of sight with respect to the reel presentation device such that a user, while positioned for playing a game on the gaming machine, can view both video display device and the reel presentation device along the common line of sight through a viewing window of said external cabinet;

game presentation logic for execution on the processor to (i) determine which of multiple available game types to present on the video display device, and (ii) present video display data for the game types determined in (i) to be played on the gaming machine; and a mechanism configured to move either the video display device or the reel presentation device into and out of position along the common line of sight based on the determination made by the game presentation logic as to which of the multiple available game types is to be presented on the video display device, such that both the video display device and the reel presentation device can be moved to a different location within said external cabinet wherein they are no longer viewable by a user through said viewing window.

35. The gaming machine of claim 34, further comprising instructions for downloading to the gaming machine, code for playing a game and digital video data for output on the digital display device.

36. The gaming machine of claim 34, wherein the game presentation logic comprises instructions for selecting one of multiple stored games for play on the gaming machine.

37. The gaming machine of claim 34, wherein the reel presentation device comprises mechanically rotatable reels.

38. The gaming machine of claim 34, wherein the reel presentation device comprises a video reel display.

39. The gaming machine of claim 38, wherein the video reel display and the video display device are configured to cooperate in displaying three-dimensional visual output that has an actual three-dimensional depth along the common line of sight.

40. The gaming machine of claim 34, wherein the video display device comprises a liquid crystal display.

41. The gaming machine of claim 34, wherein the game play comprises playing a slot game.

42. The gaming machine of claim 34, wherein the reel presentation device comprises an OLED device for displaying the symbols.

43. The gaming machine of claim 34, further comprising a projection-type display device configured to cast an image of reel symbols onto the reel presentation device.

44. The gaming machine of claim 34, further comprising a touch screen proximately located along the common line of sight and positioned to allow a player to select options presented on the video display device along the common line of sight.

45. A method of displaying information pertaining to game play in a game of chance in a gaming machine having a video display device and a reel presentation device positioned along a common line of sight such that a user, while positioned for playing a game on the gaming machine, can view both video display device and the reel presentation device along the common line of sight through a viewing window of a cabinet of the gaming machine, the method comprising:

(a) determining which of multiple available game types, including at least one slot game, to present on the video display device;

(b) moving either the video display device and the reel presentation device into and out of position along the common line of sight based on the determination made as to which of the multiple available game types is to be presented on the video display device, such that both the video display device and the reel presentation device can be moved to a different location within said cabinet wherein the are no longer viewable by a user through said viewing window; and (c) presenting video display data for the game types determined in (a) to be played on the gaming machine.

46. The method of claim 45, wherein the reel presentation device comprises mechanically rotatable reels.

47. The method of claim 45, wherein the reel presentation device comprises a video reel display.

48. The method of claim 47, further comprising presenting data to the video reel display and the video display device to cause display of a three-dimensional visual output that has an actual three-dimensional depth along the common line of sight.

49. The method of claim 45, wherein the multiple available game types comprise, in addition to the slot game, at least one of a video card game, baccarat, video pachinko, a lottery, keno, and a bingo game.

50. The method of claim 45, further comprising controlling a display of symbols on the reel presentation device.

51. The method of claim 45, further comprising processing information provided from a touch screen proximately located along the common line of sight and positioned to allow a player to select options presented on the video display device.

52. A system comprising one or more gaming machines on a network, wherein at least one of the gaming machines comprises:

(a) a processor configured to execute instructions from memory that permit game play on the gaming machine;

(b) a reel presentation device mounted to or within an external cabinet;

(c) a video display device positioned in front of and along a common line of sight with respect to the reel presentation device such that a user, while positioned for playing a game on the gaming machine, can view both video display device and the reel presentation device along the common line of sight through a viewing window of a cabinet of a gaming machine;

(d) game presentation logic for (i) determining which of multiple available game types to present on the video display device, and (ii) presenting video display data for the game types determined in (i) to be played on the gaming machine; and (e) a mechanism configured to move either the video display device or the reel presentation device into and out of position along the common line of sight based on the determination made by the game presentation logic as to which of the multiple available game types is to be presented on the video display device, such that both the video display device and the reel presentation device can be moved to a different location within said cabinet wherein they are no longer viewable by a user through said viewing window.

53. The system of claim 52, further comprising a server on the network, which server provides information for executing game plays on at least one of the gaming machines.

54. The system of claim 52, further comprising a server on the network, which server provides downloadable games for execution on at least one of the one or more gaming machines.

55. The system of claim 52, comprising at least two gaming machines on the network, wherein the at least two gaming machines share said multiple available game types.

56. The system of claim 52, wherein the game presentation logic of the gaming machine further comprises logic for presenting game information in 3-dimensional images on the video display device in conjunction with the reel display.

57. The system of claim 52, wherein the reel presentation device comprises mechanically rotatable reels.

58. The system of claim 52, wherein the one or more reels or the reel presentation device comprises a video reel display.

59. The system of claim 58, wherein the video reel display and the video display device are configured to cooperate in displaying three-dimensional visual output that has an actual three-dimensional depth along the common line of sight.

60. The system of claim 52, wherein the video display device comprises a liquid crystal display.

61. The system of claim 52, wherein the game play comprises playing a slot game.

62. The system of claim 52, wherein the reel presentation device comprises an OLED device for displaying the symbols.

63. The system of claim 52, further comprising a projection-type display device configured to cast an image of reel symbols onto the reel presentation device.

* * * * *